United States Patent
Martinez et al.

(10) Patent No.: US 6,725,772 B2
(45) Date of Patent: Apr. 27, 2004

(54) SYSTEM ADMIXTURE COMPENSATION SYSTEM AND METHOD

(75) Inventors: Henry Martinez, Dallas, TX (US); Barry W. Krause, Dallas, TX (US); Charles Martinez, Dallas, TX (US)

(73) Assignee: Ackley Martinez Company, Dallas, TX (US)

( * ) Notice: Subject to any disclaimer, the term of this patent is extended or adjusted under 35 U.S.C. 154(b) by 0 days.

(21) Appl. No.: 10/199,202

(22) Filed: Jul. 19, 2002

(65) Prior Publication Data

US 2003/0089262 A1 May 15, 2003

Related U.S. Application Data

(60) Provisional application No. 60/308,711, filed on Jul. 30, 2001.

(51) Int. Cl.$^7$ ................................................. B41M 1/14
(52) U.S. Cl. ........................ 101/211; 101/181; 358/2.1; 345/597; 356/402; 356/421
(58) Field of Search ................................ 101/211, 181, 101/365, 483, 484, 171, 174; 358/1.9, 2.1, 3.15, 534; 345/603, 597, 589, 590; 356/402, 407, 421

(56) References Cited

U.S. PATENT DOCUMENTS

| | | | |
|---|---|---|---|
| 3,926,117 A | 12/1975 | Milligan | 101/211 |
| 3,951,668 A | 4/1976 | Schumacher et al. | 106/20 |
| 4,656,941 A | 4/1987 | Brovman | 101/426 |
| 4,665,496 A | 5/1987 | Ott | 364/526 |
| 4,706,206 A | 11/1987 | Benoit et al. | 364/526 |
| 4,717,954 A | 1/1988 | Fujita et al. | 358/80 |
| 4,852,485 A * | 8/1989 | Brunner | 101/211 |
| 4,878,977 A | 11/1989 | Kueppers | 156/264 |
| 4,881,181 A | 11/1989 | Jeschke et al. | 364/519 |
| 4,918,622 A * | 4/1990 | Granger et al. | 345/597 |
| 4,924,323 A | 5/1990 | Numakura et al. | 358/456 |
| 4,926,254 A | 5/1990 | Nakatsuka et al. | |
| 4,944,746 A | 7/1990 | Iwata et al. | 606/195 |
| 4,947,746 A | 8/1990 | Jeschke et al. | |
| 4,959,659 A * | 9/1990 | Sasaki et al. | 347/43 |

(List continued on next page.)

FOREIGN PATENT DOCUMENTS

JP 36-3254469 * 10/1988

OTHER PUBLICATIONS

"Stochastic Screening," promotional material from website of Edward Enterprises, Inc. (©1995–1999).

*SWOP* (Specifications Web Offset Publications), Eighth Edition, by SWOP, Inc., NY, NY (1997).

(List continued on next page.)

*Primary Examiner*—Eugene H. Eickholt
(74) *Attorney, Agent, or Firm*—Munsch Hardt Kopf & Harr, P.C.

(57) ABSTRACT

A method provides reference profile density values for at least one color combination having a plurality of colors produced by a reference device using a reference colorant set, at least one overprint color combination having reference initial percent dot values (IPDVs); providing current profile density values for at least one color combination produced by a current device using a current colorant set, at least one color combination produced by the current colorant set having current IPDVs; quantifying reference theoretical percent dot values (TPDVs) as efficiency attributes using reference colorant set; quantifying current TPDVs as efficiency attributes using the current colorant set; and calculating factors that compensate for at least one difference between image data produced with the reference colorant set and image data to be printed with the current colorant set in response to reference efficiency attributes and current efficiency attributes, factors used to adjust and generate image data.

38 Claims, 6 Drawing Sheets

U.S. PATENT DOCUMENTS

| | | | | |
|---|---|---|---|---|
| 4,975,862 A | | 12/1990 | Keller et al. ................. | 364/526 |
| 5,068,810 A | | 11/1991 | Ott .............................. | 364/526 |
| 5,122,977 A | | 6/1992 | Pfeiffer ................... | 364/551.01 |
| 5,163,012 A | | 11/1992 | Wuhrl et al. ................. | 364/552 |
| 5,212,741 A | * | 5/1993 | Barski et al. ............... | 382/156 |
| 5,224,421 A | | 7/1993 | Doherty ...................... | 101/211 |
| 5,293,539 A | | 3/1994 | Spence ........................ | 358/527 |
| 5,315,380 A | | 5/1994 | Ingraham et al. ........... | 358/500 |
| 5,317,425 A | | 5/1994 | Spence et al. .............. | 358/504 |
| 5,333,069 A | | 7/1994 | Spence ........................ | 358/517 |
| 5,343,234 A | | 8/1994 | Kuehnle ..................... | 346/159 |
| 5,432,892 A | | 7/1995 | Hafner et al. ............... | 395/131 |
| 5,491,558 A | * | 2/1996 | Hamilton et al. .......... | 358/3.15 |
| 5,493,321 A | | 2/1996 | Zwadlo ....................... | 347/131 |
| 5,528,377 A | | 6/1996 | Hutcheson .................. | 358/298 |
| 5,544,284 A | * | 8/1996 | Allebach et al. ............ | 345/603 |
| 5,572,340 A | | 11/1996 | Eckhardt et al. ............ | 358/518 |
| 5,578,824 A | | 11/1996 | Koguchi et al. ............. | 250/318 |
| 5,579,044 A | | 11/1996 | Warner et al. ............... | 347/236 |
| 5,598,272 A | | 1/1997 | Fisch et al. ................. | 358/298 |
| 5,615,282 A | | 3/1997 | Spiegel et al. .............. | 382/167 |
| 5,636,330 A | | 6/1997 | Barak ......................... | 395/109 |
| 5,676,887 A | | 10/1997 | Soeda et al. .................. | 261/35 |
| 5,677,967 A | | 10/1997 | Pariser ....................... | 382/167 |
| 5,687,300 A | | 11/1997 | Cooper ....................... | 395/109 |
| 5,721,811 A | | 2/1998 | Eckhardt et al. ............ | 395/109 |
| 5,734,800 A | | 3/1998 | Herbert et al. .............. | 395/109 |
| 5,745,120 A | | 4/1998 | De Baer et al. ............. | 345/431 |
| 5,754,448 A | | 5/1998 | Edge et al. .................. | 364/526 |
| 5,761,327 A | | 6/1998 | Papritz ....................... | 382/112 |
| 5,781,206 A | | 7/1998 | Edge ........................... | 347/19 |
| 5,816,151 A | | 10/1998 | Wang et al. ................. | 101/171 |
| 5,832,109 A | | 11/1998 | Mahy .......................... | 382/162 |
| 5,835,244 A | | 11/1998 | Bestmann ................... | 358/523 |
| 5,870,530 A | | 2/1999 | Balasubramanian ........ | 395/109 |
| 5,877,787 A | | 3/1999 | Edge ........................... | 347/19 |
| 5,892,891 A | | 4/1999 | Dalal et al. .................. | 395/109 |
| 5,933,578 A | * | 8/1999 | Van de Capelle ........... | 358/1.9 |
| 5,947,029 A | | 9/1999 | Loeffler et al. .............. | 101/484 |
| 5,957,049 A | | 9/1999 | Ammeter et al. ........... | 101/211 |
| 5,967,050 A | | 10/1999 | Seymour ..................... | 101/484 |
| 5,988,067 A | | 11/1999 | Ishida et al. ................. | 101/484 |
| 5,995,655 A | | 11/1999 | Lockett et al. .............. | 382/162 |
| 6,027,201 A | | 2/2000 | Edge ........................... | 347/19 |
| 6,041,708 A | * | 3/2000 | Kipphan et al. ............ | 101/211 |
| 6,043,909 A | | 3/2000 | Holub ......................... | 358/504 |
| 6,215,561 B1 | * | 4/2001 | Kakutani ..................... | 358/1.9 |
| 6,215,562 B1 | | 4/2001 | Michel et al. | |
| 6,483,607 B1 | | 11/2002 | Van de Capelle et al. | |
| 6,512,597 B1 | * | 1/2003 | Cooper et al. ............... | 358/1.9 |
| 6,519,055 B1 | * | 2/2003 | Curry et al. .................. | 358/2.1 |
| 6,523,468 B1 | * | 2/2003 | Löffler ......................... | 101/211 |

OTHER PUBLICATIONS

Davis, M. and Davison, B., "Calculating the 'Net' Effect," *Publishing & Production Executive*, pp. 25–32 (Aug. 1997).

"Graphic technology—Colour and transparency of ink sets for four–colour–printing," Part 1: Sheet–fed and heat–set web offset lithographic printing, *International Standard* (ISO 2846–1:1997(E)), First Edition, pp. 1–19 (Dec. 15, 1997).

Moretta, R., "Process Workflow White Paper, The easiest way to achieve brilliant results," *PANTONE® Hexachrome®†* (Mar. 1998).

*The Color Guide and Glossary*, X–Rite, Incorporated, Grandville, Michigan (1998).

Adams, R. and Romano, F., *Computer–to–Plae Primer*, GATF*Press*, Pittsburgh (1999).

*General Requirements for Applications in Offset Lithography* (GRACoL™), Version 3.0, by Graphic Communications Association (©1999).

Fenton, H., adaption of article "Process Control: Missing LINK In," *Graphics Arts Monthly*/www.gammag.com, pp. 64–70 (10/99).

Kohler, T., "ICC Achievements and Challenges," from website http://www.color.org/iccach 1.html of Canon Information Systems.

"Harmony, Flexible Dot Gain Calibration Harmony Advantages," promotional material from website of Creo Products, Inc.

Adobe Photoshop 5.0 User Guide for Macintosh and Windows, Adobe Systems Incorporated, 1998, p. 127.

Tony Johnson, "An Effective Colour Management Architecture for Graphic Arts," London College of Printing, 2000, 13 pages.

Gary G. Field, "Color and Its Reproduction," Graphic Arts Technical Foundation, 2nd ed., 1999, pp. 192–194, 405–406.

World Wide Web http://www.wasatchinc.com/digigrafix.gamut.html, "Color Gamut and Gamut Mapping," printed on Dec. 11, 2000, 3 pages.

David McDowell, et al, "To Chase the Press, . . . or Not to Chase the Press!" The Prepress Bulletin, Jul./Aug., 1997, pp. 16–18, 20.

World Wide Web, http://www.color.org/iccach1.html, Tim Kohler, "ICC Achievements and Challenges," printed Nov. 18, 2000, 6 pages.

World Wide Web, http://www.color.org.wpaper1.html, Michael Has, et al., "Color Management: Current Practice and The Adoption of a New Standard," printed Nov. 18, 2000, 15 pages.

World Wide Web, http://www.color.org/papers.html, Articles/Publications About ICC Profiles, printed Nov. 18, 2000, 2 pages.

* cited by examiner

SYSTEM ADMIXTURE COMPENSATION SYSTEM AND METHOD

RELATED APPLICATION

This patent application claims the benefit of Provisional Patent Application, Ser. No. 60/308,711, entitled System Admixture Compensation System and Method, filed on Jul. 30, 2001, the disclosure of which is incorporated herein by reference.

FIELD OF THE INVENTION

This invention relates in general to the field of printing and, more particularly, to a system admixture compensation system and method.

BACKGROUND OF THE INVENTION

Full-color printing on offset presses has become relatively reliable and affordable for clients long accustomed to printing in black and white or with just one or two pre-mixed spot inks. Such printing utilizes photo-chemical processes to reduce original multi-colored materials to the four constituent colors used in printing. For example, printed color images currently typically combine different intensities of four basic colors—Magenta ("M"), Yellow ("Y"), Cyan ("C"), and Black ("K")—using a printing process known as four-color-process printing. In practice, accurately printing a color image to a customer's satisfaction is often times tedious, problematic and time consuming, as it usually requires manual intervention. For example, conventional four-color-process printing usually utilizes presses that are only designed to either apply or not apply a single amount of ink to any given location on a page. To reduce the number of errors and expenses associated with errors in acceptable print quality off the press, proofs are usually used.

To illustrate, four-color-process printing requires a reliable color proof for use as a guide for press operators and customers in finalizing a printing press to perform a production print job. For example, the proof conveniently and inexpensively provides a printing prototype for a customer to approve color appearances to be used on a production print job, in an easily-changed and viewable image. A single piece of film for each of the four colors is also required by the platemaker to make thin printing plates that are wrapped on the drums of the printing press, covered with the appropriate inks, which are then indirectly rolled over sheets of paper during the printing process. Computer-to-Plate (CTP) technology can eliminate the need for film in the plate-creation process.

Traditional attempts in performing or addressing aspects of the color management process for Reflective Multi-Color Reproduction Systems (RM/CRSs) include approaches which typically suffer from compromises and results that in many cases customers in the printing industry feel are unsatisfactory. For example, traditional quality control specifications such as Specifications Web Offset Publications (SWOP) have utilized solid ink density, ink color (hue)/sequence, and dot gain and print contrast to control variables, with only limited success.

SUMMARY OF THE INVENTION

Unfortunately, a proof includes inherent tone and color differences from a press sheet, and a great deal of time is consumed in assessing how to improve the coincidence of the tone and color reproduction characteristics of a press to those of a proofing system. Moreover, SWOP specifications do not typically discuss several variables such as proportionality failure rates, system admixture characteristics, and color gamut mismatches that color scientists use in characterizing color reproduction. International Color Consortium (ICC) color management systems have also attempted to address the color management process by utilizing colorimetry measurements, usually in a single graphic data file multi-dimensional transformation process, but practitioners in the printing press industry usually believe that this type of adaptation is inadequate. These systems also fail to separate or compensate for these variables. ICC-colorimetry based color management systems also attempt to map points on a larger color gamut to a nearest point on a smaller color gamut by a variety of corrections, such as relative or absolute colorimetric or photometric. Unfortunately, this type of gamut mapping has typically resulted in compromises that are unacceptable in the printing industry. Moreover, these systems usually attempt to map colors to be used with a proofing device, which usually has a larger color gamut, to those to be used with a printing device, which usually has a smaller color gamut. These systems and methods typically limit the output achievable by a printing press.

Unfortunately and for example, the SWOP approach suffers from inconsistencies and inaccuracies because, among other things, this approach utilizes dot gain and print contrast measurements, which may not provide the right measurements to perform aspects of accurate color management. Moreover, these systems and methods do not consider varying effects from the principle variables that ultimately should be addressed in the color management process. For example, tonal reproduction characteristics vary widely with characteristics of a reflective reproduction device such as electrophotographic, thermal, laser and inkjet printers, and offset lithography, letter press, gravure, and flexography printing presses and peripheral conditions, and traditionally are reported as dot gain and print contrast. Many of these variations that may be caused by fluctuations in press printing conditions' printing characteristics including, but not limited to, variations due to paper/base substrates, inks, plates, fountain solutions, image transferring cylinder blankets, press mechanical settings and ambient moisture/temperature conditions may change batch-to-batch or day-to-day. These fluctuations usually affect the printing device's reproduction characteristics during each production print job and, unfortunately, it is not practical to track down causes of these fluctuations.

From the foregoing, it may be appreciated that a need has arisen for a system admixture compensation system and method. In accordance with teachings of the present invention, a system and method are provided that may substantially reduce or eliminate disadvantages and problems of conventional printing systems.

Aspects of the invention may provide several important advantages. Various embodiments of the invention may have none, some, or all of these advantages. For example, one aspect of the invention is a method for gathering data such as density data that provides more control in the color management process. The method includes providing reference profile density values for at least one color combination having a plurality of colors produced by a reference device using a reference colorant set. The reference colorant set has reference initial percent dot values (IPDVs) for the at least one color combination. The method also includes providing current profile density values for at least one color combination produced by a current device using a current colorant set. The current colorant set has current IPDVs for the at least one color combination. The method also includes quantifying reference theoretical percent dot values (TPDVs) as efficiency attributes using the reference colorant set and quantifying current TPDVs as efficiency attributes using the current colorant set. The method also includes calculating percent dot value correction factors that compensate for at least one difference between image data produced with the reference colorant set and image data to be printed with the current colorant set in response to the reference efficiency attributes and the current efficiency attributes, the factors to be used to adjust and generate the image data to be printed. Such calculations may provide substantially representative characteristics of a full tonal scale (1–100%) for press and/or proofing conditions, and the ability to provide factors that may be applied to, for example, digital representations of images, at a computer-to-plate (CTP) or direct imaging press production phase. In other words the accuracy, with which the appearance of the outputs of one reflective reproductive system may be made to correspond to another, may be improved.

Another aspect of the invention may also provide for separately compensating for two of five principle variables. For example, one embodiment of a system admixture compensation method includes identifying system admixture characteristics of data produced by a reference colorant set as reference TPDVs in response to reference profile density values and reference IPDVs. The method also includes identifying system admixture of data produced by a current colorant set as current TPDVs in response to current profile density values and current IPDVs. The method also includes providing color gamut density adjustment factors (CGDAFs) if the sum of at least one of the factors and a corresponding at least one of the initial reference IPDVs exceeds 100 percent. The CGDAFs may correct the color gamut mismatch and at least one of the factors may be calculated by determining a control component and calculating a product of a first value equal to a targeted solid major density aimpoint of the control component and the at least one factor, and a second value equal to a reference TPDV, for the control component, that is required to achieve a measured density for at least one of a plurality of color channels if a system using the reference colorant set had perfect efficiency divided by a current TPDV, for the control component, that is required to achieve a measured density for at least one of a second plurality of color channels if a second system using the current colorant set had perfect efficiency to obtain the at least one factors. In addition, at least one of the factors compensates for at least one difference between image data produced with the reference colorant set and image data to be printed with the current colorant set and is used to adjust and generate the image data to be printed. Such advantages provide the present invention the advantage of compensating for differences between multiple colorant sets and their corresponding RM/CRSs with different additivity failure characteristics, for a variety of systems.

Another aspect of the invention may also separate out factors that may be caused by fluctuations in printing press and peripheral printing conditions' printing characteristics that affect the printing device's reproduction characteristics. These fluctuations include, but are not limited to, variations due to paper/base substrates, inks, plates, fountain solutions, image transferring cylinder blankets, press mechanical settings, ambient air conditions, ambient moisture conditions, ambient temperature conditions, and chemical residue conditions, which may change batch-to-batch or day-to-day. Chemical residue conditions vary with characteristics of, for example, plate or blanket wash chemistry, roller residue, wear and tear on press components, and a variety of ambient air conditions.

Another aspect of the present invention is a data form. The system admixture data form includes a first column representing a plurality of one-dimensional color control regions produced using a colorant set. The first column is located approximately along a first axis generally parallel to an output path of a press output device. The system admixture data form also includes a second column representing a plurality of multi-dimensional color control regions produced using the colorant set. The second column is located approximately along a second axis generally parallel to and at a lateral spacing from the first column. The first axis and the second axis are positioned proximate to one another and the lateral spacing does not exceed a predetermined distance. In a particular embodiment, the predetermined distance does not exceed 25 millimeters. In yet another embodiment, the second column is selected from the group consisting of the magenta, red, green, cyan, yellow, blue, and neutral families.

One embodiment of a system admixture data form provides for arrangement of data in color families. The present invention provides the advantage of allowing for the use of color image editing engine (CIEE) functionality, which allows adjustments to be made to all color families as desired. The present invention provides the advantage of providing suitable color samples for which applicable measurements may be taken. In addition, one or more aspects of the present invention may provide the advantage of reducing calculation inaccuracies by reducing any differences in ink film thickness and tone reproduction characteristics between measurements. Such an advantage may reduce system errors that affect color manageability.

Another aspect of the invention may also provide for calculation of CGDAFs, which may reduce or remove the effects of compromises reached by traditional color management systems' photometric or colorimetric corrections. Moreover, CGDAFs may be utilized in a method in conjunction with percent dot value color correction factors (PDCCFs) and/or secondary PDCCFs to calculate a density that corresponds to a larger than 100% dot value to be used with a printing device, which usually has a smaller color gamut, to those to be used with a proofing device, which usually has a larger color gamut. Other technical advantages may be readily ascertainable by those skilled in the art from the following figures, description and claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The present invention envisions quantifying system admixture characteristics by characterizing additivity failure of a reflective multi-color reproduction system (RM/CRS) that is using a colorant set. The invention contemplates the use of RM/CRSs such as Reflective Four-Color CRS (R4/CRS), Three-Color CRS (R3/CRS), and/or other multi-color systems as applicable, now known or as developed in the future. Moreover, methods and systems of the present invention envision facilitating aspects of the color management process where RM/CRSs are used by characterizing, and separately compensating for, several variables such as tone reproduction, proportionality failure rates, system admixture characteristics, and color gamut mismatches that imaging scientists use in characterizing color reproduction.

Color gamut mismatches may be caused by either a) mismatch of subtractive primary colorants' solid densities and hues, and thus mismatches of overprint color combinations between sets of colorants, or b) effects from additivity failure on prints. This gamut mismatch caused by additivity failure occurs even where standalone solid subtractive primary colorants of a first RM/CRS are printed to match a second reflective reproductive system's solid density and hues, contrary to most standard industry assumptions. For example, where a first system's subtractive primary (C, M, and Y) colorants are printed to match those of a second system, resulting overprints of magenta and yellow, cyan and yellow and cyan and magenta typically do not match the respective red, green and blue colors between the two systems. These overprints may also have major differences in chroma (color intensity), thereby indicating that there are color gamut mismatches affecting all deep intense colors.

Additivity failure may be defined as an under or over efficiency attributed to effects produced in applying a layer of colorant on top of a previously applied layer of colorant compared to the affects produced by an ideal state "of applying a colorant directly on the substrate such as paper." One definition for the term additivity failure as used in this description and accepted by the printing and photography industries may be found in "Color and Its Reproduction," Gary G. Field, $2^{nd}$ Edition 1999, GATF Press, pages 192–194.

Figure 6:
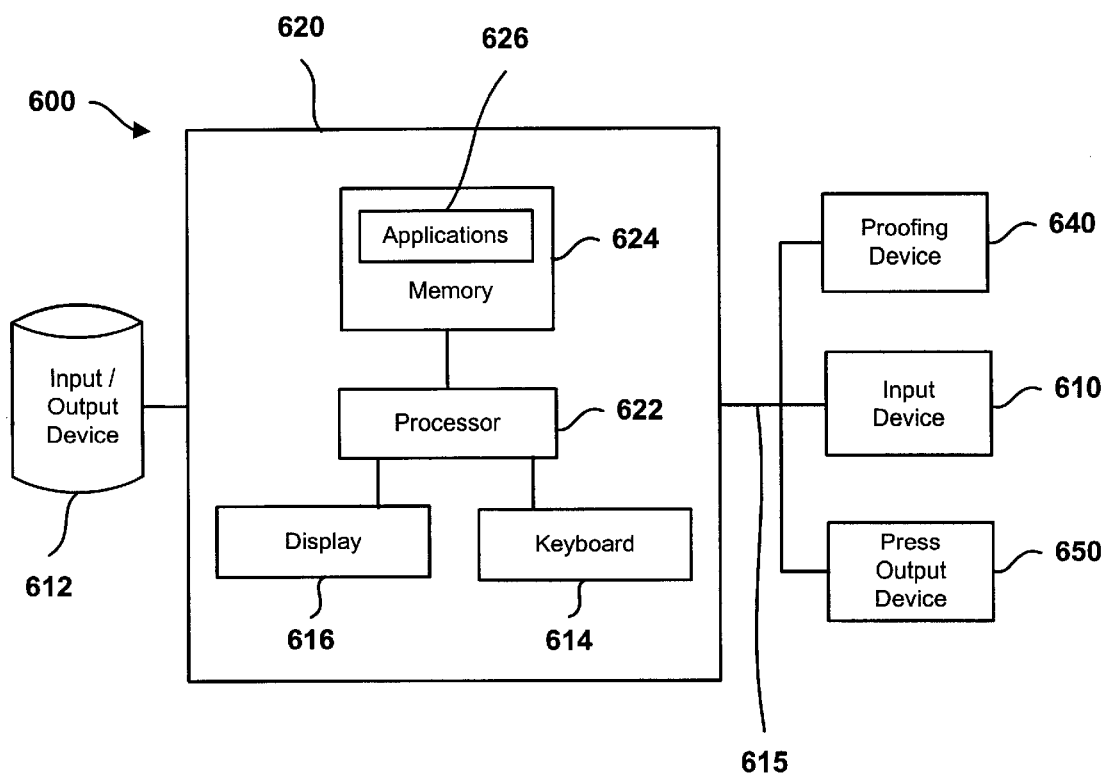
FIG. 6 is a high-level diagram illustrating an exemplary computer that may be used with the present invention.

Color density measurements may be used to facilitate matching the appearance of the outputs of one RM/CRS to another using a System Admixture Data Form ("SADF"). The invention contemplates the use of a variety of RM/CRSs as shown in FIG. 6, such as offset lithography, letter press, gravure, flexography, and screen printing systems and that may be used with various lithographic processes in development such as waterless lithography, printing with single fluid water-based inks, and plateless digital offset, and in some aspects, with electrophotographic, thermal, and inkjet printing processes. For example, RM/CRSs may include proofing devices as illustrated in FIG. 6 such as, but not limited to, a variety of imaging devices such as inkjet or thermal printers, and half-tone printing devices such as Waterproof® by DuPoint, Matchprint™ by Imation, ColorArt by Fuji, or Approval by Kodak. These devices may use a variety of methods to produce a proof on a substrate, including interim film and direct digital output. Various aspects of the invention may be used with some or all of these press output devices.

Color densities of any measurement sample are usually provided using four measurement channels: C, M, Y, and V.

Many types of density measurements may be used such as, but not limited to, ISO Status—T, A, M, E and I spectral types of density.

C, M, Y, and V represent the following:

C=description of the capacity of a RM/CRS to absorb the red wavelength region of the color spectrum which is complemented by the Cyan ink color;

M=description of the capacity of a RM/CRS to absorb the green wavelength region of the color spectrum which is complemented by the Magenta ink color;

Y=description of the capacity of a RM/CRS to absorb the blue wavelength region of the color spectrum which is complemented by the Yellow ink color;

V=description of the CMY color density values translated to an achromatic (i.e., gray) value which is primarily used to describe the Black ink color.

Solid density refers to a set of CMYV density measurements taken from a solid, or non-screened, area of an image, using a spectrophotometer, densitometer, scanner, or other color density measurement device. Among C, M, and Y, major density refers to the density measurement of a color sample that is the highest value from among C, M, and Y, and include primary colors C, M, and Y. For the K file, Black ink channel, the major density refers to the density measurement taken solely from the V channel. Some of the densities that are discussed on this description may be expressed as "–Paper", or "–P", which represents a subtracted optical density value of a paper/base substrate from a density value of a color sample.

The abbreviations C, M, Y, and K may be used to identify the four traditional process colors used in printing for things such as inks, plates, films, and file channels. These four colors are Cyan, Magenta, Yellow, and BlacK, respectively and measurements for C, M, Y and K are taken from the C, M, Y and V measurements as discussed above. C, M, Y, and K may be combined to create overprint color combinations. For example, Green is formed by an overprint of Yellow and Cyan, Red is formed by an overprint of Yellow and Magenta, and Blue is an overprint of Magenta and Cyan. While the term "ink" is used in this description, the invention contemplates using other methods for delivering and managing colorants in the process of printing such as, but not limited to, toners, dyes, pigments, vehicles and modifying components.

Figure 1:
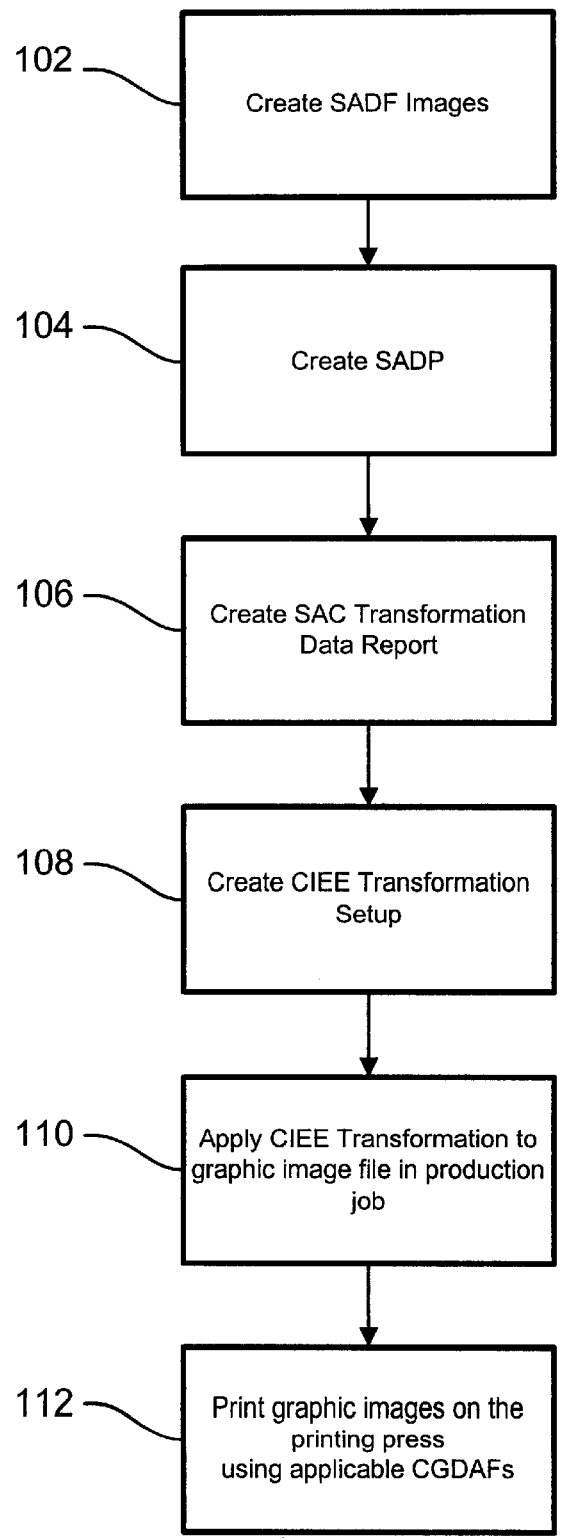
FIG. 1 is an example of a method for providing printing adjustments in accordance with the present invention.

Referring now to FIG. 1, there is shown an example of a flow diagram for a system admixture compensation method in accordance with the teachings of the present invention. The method provides generally for isolating variables associated with aspects of color management and utilizing first colorant data to adjust values for second colorant data to be used in a print production job. These calculations include calculating percent dot values from densities for the first colorant data that may be subsequently compared to those of second colorant data. This comparison facilitates precise calculation of transformation data that may be used for each of the four colors C, M, Y, and K to provide adjustments to more closely align selected characteristics of the second colorant data to the first colorant data. More specifically, the method provides for more closely aligning two sets of system admixture characteristics by characterizing additivity failure of a first RM/CRS that is using a first colorant set with additivity failure of a second RM/CRS that is using a second colorant set. System admixture characteristics may be defined as characteristics, such as additivity failure or efficiency measurements, of a RM/CRS that is using a colorant set. In this way, aspects of the invention facilitate the color management process of RM/CRSs.

These adjustments may be expressed in percent dot value color correction factors (PDCCFs) and may be made by, for example, using a color image editing engine to alter the percent dot values on a digital representation of the image. The method also provides for various adjustments expressed as density adjustment factors (such as color gamut density adjustment factors, "CGDAFs") to be made that may reduce color gamut mismatch between the colorant data. These may first be applied to a colorant set's Solid Major Density Aimpoints at make-ready phase of production and sustained throughout a production run. Both of these adjustments provide objective data that may allow higher quality control over the appearance and fidelity with which a traditional production print job is produced.

Unfortunately, color gamut mismatches often are problematic with the use of traditional methods, especially in deep intense colors, usually due to major differences in chroma, or color intensity. These differences typically result from the differences in additivity failure between two RM/CRSs. For example, traditional printing methods and systems utilize a process of printing solid or 100 percent subtractive primary CMY colorants of a first RM/CRS to match those of a second RM/CRS in terms of solid density and hue error. Any resulting overprints such as magenta and yellow, cyan and yellow, and cyan and magenta do not typically match red, green, and blue, respectively.

Aspects of the present invention contemplate separately compensating for variations in system admixture characteristics, and color gamut mismatches in contrast to traditional and color management methods. For example, ICC color management methods do not attempt to separate these variables, but perform processing through a single multi-dimensional transformation process by replacing colors with colorant gamut mismatches in a graphic data file by gamut mapping using look-up tables in an integrative process. As another example, SWOP has traditionally characterized these variables and attempted to compensate for these variations by utilizing solid ink density, ink color (hue)/sequence, and dot gain and print contrast. Unfortunately, these methods may not adequately accommodate variations in both system admixture characteristics and color gamut mismatches of RM/CRSs.

It may be illustrative to describe solid density aimpoints that are referred to while discussing particular embodiments of the present invention. These aimpoints may be adjusted to accommodate changes, modifications or enhancements in technology. For example, the commercial offset lithography industry utilizes general practice Targeted Solid Major Density Aimpoints as reprinted with the permission of Graphic Communications Association, GRACoL 4.0 2000, Copyright ©2000, as per Table I.

TABLE I

Targeted Solid Major Density Aimpoints*
Reprinted with the permission of
Graphics Communications Association, GRACoL ®
Is a Registered Trademark of Printing Industries of America,
All Rights Reserved

| Paper/Substrate | C | M | Y | K |
|---|---|---|---|---|
| Grades 1 and 2 premium gloss/dull coated | 1.40 | 1.50 | 1.05 | 1.70 |
| Grades 1 and 2 premium matte coated | 1.30 | 1.40 | 1.00 | 1.60 |
| Premium text and cover (smooth) | 1.15 | 1.15 | .90 | 1.30 |
| Grades 3 and 5 coated** | 1.30 | 1.40 | 1.00 | 1.60 |
| Supercal SCA | 1.25 | 1.35 | 1.00 | 1.50 |
| Supercal SCB/SCC | 1.10 | 1.15 | .95 | 1.40 |
| Uncoated | 1.00 | 1.12 | .95 | 1.25 |

TABLE I-continued

Targeted Solid Major Density Aimpoints*
Reprinted with the permission of
Graphics Communications Association, GRACoL ®
Is a Registered Trademark of Printing Industries of America,
All Rights Reserved

| Paper/Substrate | C | M | Y | K |
|---|---|---|---|---|
| Newsprint | .90 | .90 | .85 | 1.05 |
| Newsprint (heatset) | 1.08 | 1.15 | .95 | 1.20 |

*Values are Status-T density, absolute (paper included)
**Same as SWOP ® printing production guidelines For the purposes of examples stated herein, Solid Major Density-P Aimpoints refer to a solid major density of generally accepted proofing systems currently available or hereinafter developed. To illustrate teachings of the present invention, one example set of Solid Major Density Aimpoints that may be used as the CP's Solid Major Density-P Aimpoints in a production run after CGDAFs have been calculated and subsequently applied to the RP's Solid Major Density-P Aimpoints are C=1.60, M=1.60, Y=1.10 and K=1.75. Selected values are utilized to provide adjustments to second colorant data in response to first colorant data.

In general, the method quantifies values measured from system admixture data profiles (SADP) prepared using SADFs denoted as a Reference Profile (RP) and a Current Profile (CP) and representative of the CP to more accurately match the appearance of the printed results of the colorants used in the RP. The method adjusts for effects of additivity failure by creating a number of calculated variables such as Theoretical Percent Dot Values (TPDVs), Percent Dot Color Correction Factors (PDCCFs), secondary PDCCFs and/or Color Gamut Density Adjustment Factors (CGDAFs) to address management of system admixture characteristics and color gamut mismatches. As one example, any over and/or under efficiency effects of additivity failure may be related to an Initial Percent Dot Value (IPDV) of a color sample of interest (SOI). One method for performing this step may include translating resulting densities of these effects into TPDVs, to include establishing percent dot value as a common definition to calculate PDCCFs, secondary PDCCFs and/or color gamut expansion factors to provide system admixture compensation. A TPDV is a percent dot value that would theoretically achieve the measured density for a given SOI absent additivity failure. For example, the Tone Reproduction Color Sample (TRCS) IPDV and the resulting TRCS density data may be used as the basis scale to arrive at the TPDV. PDCCFs may then be calculated in response to the TPDVs. One method for calculating PDCCFs is discussed in conjunction with FIG. 4.

In addition, creation of TPDVs and subsequent PDCCFs may also be advantageous in providing CGDAFs, PDCCFs, and secondary PDCCFs that are substantially independent of tone reproduction characteristics. TPDVs, PDCCFs and CGDAFs may be provided for any number of colorants and colorant sets. CGDAFs are density values that may be calculated to expand a color gamut in terms of chroma or color intensity of one colorant set to concur with a larger color gamut of a second colorant set. Such an advantage may reduce color gamut mismatches, especially in deep intense colors, usually due to major differences in chroma, or color intensity, which may provide more desirable results than those obtained by traditional color management systems, whose gamut mapping techniques alter color values in a graphic data file to obtain a "best fit" of one color gamut within another. Such an advantage may thus be more successful than these traditional 'gamut fit' methods when attempting to adjust data used to create printed press sheets whose appearances match those of press photomechanical proofs.

For example, in some cases, a colorant set used to create the RP will have a larger RGB color gamut in terms of chroma or color intensity than that used to create the CP to which the RP is being compared. In these cases, the desired percent dot value, an Adjusted File Percent Dot Value (AFPDV), derived for the SOIs of the colorants used in the CP from applying the method of the present invention may be greater than 100 percent, and the colorant set used in the CP must be printed in print production using higher Solid Major Density Aimpoints than those used for the colorant set of the RP. The present invention envisions correcting any mismatch of the color gamuts by calculating CGDAFs to apply to the Solid Density Aimpoints of the colorant set used to create the CP during a subsequent production print session. Because the PDCCFs are substantially independent of the tone reproduction characteristics of the RM/CRS that utilizes the colorants, any CGDAF calculated in response to PDCCFs also becomes substantially independent of variations in tone reproduction characteristics.

The method begins at step 102, where a SADF may be created from which SADPs may be created in step 104. SADPs may be created by taking measurements of some or all of the color samples in a SADF image from a spectrophotometer, or other density-measuring device such as a densitometer. One example for a SADF is discussed in further detail in conjunction with FIG. 2. Two SADPs are created, a RP and a CP. Colorant sets utilized in the creation of these SADFs are composed of four colorants and may be selected from a multitude of available colorants such as inks. These colorants may vary, but the four colorants C, M, Y, and K used for each of the SADPs should be spectrally similar so that they appear to an observer as substantially the same color. In addition, when like colors are compared between each of the SADPs, solid, one-dimensional color samples should have a density–P value that is substantially equal. However, any overprinting for each of the SADPs may be applied to the substrate in sequentially any order. As one example, in a first SADP, black inks may be applied first, Cyan inks second, Magenta third, and Yellow fourth while in a second SADP, the inks may be applied in a reverse, or any other, order. Colorant sets used to create the SADF Sample Sheets should also be produced on substrates that have substantially similar characteristics such as coating and surface texture and by using substantially the same halftone pattern. In addition, when like colors are compared between each of the SADP's, tonal one-dimensional colorant samples should have proportionality failure characteristics that are substantially similar, such as, for example, within a tolerance of +/−20% of one another. Proportionality failure characteristics and halftone patterns are both well known and halftone patterns vary with characteristics such as screen ruling and dot shape.

In one embodiment, a RP may be a SADP created by first preparing a SADF for proofing. This step may include, for example, creation of CMYK film negatives or positives from a SADF graphics computer file. Such a SADF for an RP may be output by a proofing device at predetermined calibrations, which in a preferred embodiment include the proofing system manufacturer's specifications. This proof may be created from the negatives or positives or created directly from digital proof data, and usually includes a relatively constant ink or colorant film thickness. As one example, a proofing system such as Imation Matchprint may be used. A second SADF may then be prepared for a CP. As an example, a lithographic offset press using inks in accordance with SWOP printing production guidelines. In one embodiment, computer-to-plate ("CTP") plates for the SADF are created and then a printing press run of the SADF is performed using CTP plates. For example, in a particular embodiment, creation of the CTP plates of the SADF includes exposure of the CTP plates images by laser radiant energy modulated by the contents of the computer file containing data representing the SADF.

From step 104, the method proceeds to step 106, where a System Admixture Characteristics (SAC) Transformation Data Report is prepared in response to a comparison of color density deviations or differences between the CP and the RP. This Report provides PDCCFs and CGDAFs, and secondary PDCCFs that may be used in particular cases to resolve inconsistencies introduced by CGDAFs, where applicable. Examples of methods for calculating PDCCFs and CGDAFs are discussed in conjunction with FIGS. 3 and 4. Depending on the implementation, PDCCFs, CGDAFs, and desired secondary PDCCFs may also be provided in many other alternative formats that may be used to prepare transformed graphic image data to be printed in step 112, as discussed below.

PDCCFs represent percent dot adjustments that are calculated from selected color samples measured from the CP and the RP to compensate for any variable effects that additivity failure has on different system admixture characteristics. PDCCFs include attributes of the colorant sets, and the corresponding RM/CRS that uses the colorant sets, such as "colorant trapping" and "transparency/opacity". Colorant trapping may be described as characteristics exhibited when applying one colorant on top of another colorant that has previously been applied to a substrate, in contrast to applying the one colorant directly on the substrate without another layer of colorant in between. PDCCFs may be transposed into multidimensional transformations that accommodate for interaction between color channels. As discussed below, PDCCFs may then be used with numerous software, methods or other color image editing engines (CIEEs) that are now known or that may be developed in the future.

Calculation of PDCCF's and all subsequent multidimensional transformations may provide substantial independence of the substrate on which an image is printed and of tone reproduction characteristics of the RM/CRSs that utilize the RP and CP colorants. Such an advantage also allows one-dimensional tone reproduction transformations to be applied in addition to and/or separate from the multidimensional C, M, Y, K transformations. This advantage may allow variables that typically drift frequently and that are usually tone reproductive in nature to be corrected independently from system admixture-related variables that typically are substantially stable after an initial characterization. The term one-dimensional as applied to samples and transformations refers to single colorants and calculations related thereto, while the term multi-dimensional refers to overprints of single colorants such as red (an overprint of yellow and magenta) and calculations related thereto. Examples of one-dimensional samples include TRCSs, and examples of multi-dimensional samples include Color Correction Color Samples (CCCSs), System Noise Indicator Samples (SNISs), and/or Correction Overlap Detection Samples (CODS), all of which are discussed in further detail in conjunction with FIG. 2.

CGDAFs may be used to expand the gamut of a colorant set used to create a CP so that it may accommodate a larger color gamut colorant set. For example, the gamut of a colorant set may be expanded by adjusting ink film thickness and/or by creating another colorant set with different pigment concentration. Color gamut expansion is graphically illustrated and discussed in further detail in conjunction with FIG. 5. This method may advantageously accommodate the ability to expand color gamuts, a method currently not available with the use of traditional methods. CGDAFs may be density adjustments to be applied to the Solid Major Density-P Aimpoints of a colorant set used to create a CP. Where a colorant set used to create a CP includes offset lithography inks, the Solid Major Density-P Aimpoints for each ink may be increased by the CGDAF data, and are utilized in the process of profiling or characterizing the tone reproduction characteristics of the printing press. Thus, in actual production printing, the Solid Major Density-P Aimpoints of a colorant set used to create a CP represent adjustments to those Aimpoints of the colorant set used to create the RP (in many cases, these adjustments are typically increases). Any variations in these tone reproduction characteristics may then be separately compensated for by utilizing any one of a variety of methods for providing one-dimensional printing adjustments.

Figure 2:
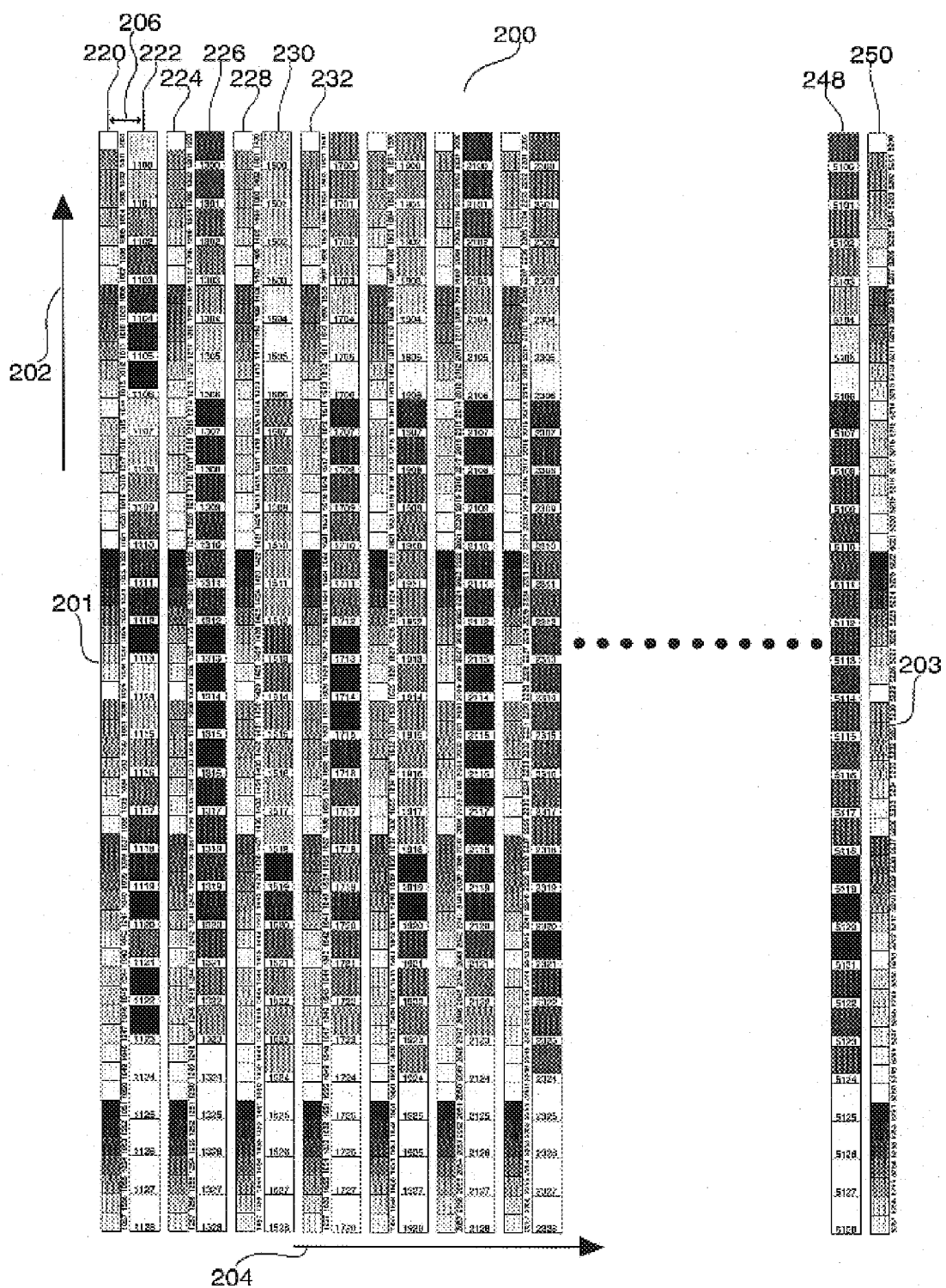
FIG. 2 is an exemplary System Admixture Data Form ("SADF") in accordance with teachings of the present invention.

In step 108, CIEE transformation setup may be created by utilizing PDCCFs in a CIEE as desired. The transformation setup provides confirmation of AFPDVs so that an operator may view changes to dot values of colors within an image to be printed in response to the PDCCFs that would take place when applied to a production job. Although future developments may reduce or eliminate the need for CIEE functionality in steps 108 and/or 110, the state of technology today usually requires translation of PDCCFs into a value system for a CIEE, where empirical adjustments may be performed to compensate for measurement error or other system limitations such as, for example, measurements affected by the application of laminate membranes. PDCCFs may be used to adjust a graphic image file's values so that the appearance of the image to be produced with a colorant set used to produce a CP would substantially correspond with the appearance of the image reproduced with a colorant set used to produce a RP. PDCCFs are data that may be suitable for use in many CIEEs. For example, in one particular embodiment, multiple passes may be performed by using the Color Range Selection, Curve Adjustment, and/or Selective Color functions in ADOBE PHOTOSHOP 5.0, which allow an operator to correct imbalances and adjust color. These correction techniques are used by high-end image editing scanners and separation programs to increase and/or decrease the amount of the process colors in each of nine predetermined color family groups in an image. For example, if calculated PDCCF values indicate that, for a selected color family and/or selected color sample, IPDVs for respective cyan, magenta, yellow and/or black control components should be increased or decreased, an operator may perform the increase or decrease. For example, control set point 1103 as illustrated in FIG. 2 may include CMYK IPDVs of 50, 50, 50, 0 respectively, which will be transposed into AFPDVs by the PDCCFs. As discussed herein, these AFPDVs are then used as a guide to print the desired control set points and other interpolated values of the CP so that they have the same appearance as those in the RP. In a particular embodiment, these values may be used to create a print production image. These may, depending on the CIEE, be performed in terms of relative or absolute increases or decreases. In one embodiment, translation into this value system may be aided by viewing an image of the SADF on a computer monitor and monitoring the color value alterations imposed by control settings of the CIEE program. These values may be saved for future use when the same combination of proofing colorants and printing colorants are used on a print job using the same RM/CRSs that created the RP and CP.

In PHOTOSHOP, selective color correction is based on a table that shows the amount of each process color being used to create any given color. An operator may increase and/or decrease the amount of processing in relation to the other processes being asked to modify selectively the amount of any one process color in any given family of colors—without affecting any other given family of colors. For example, selective color correction may be used to dramatically increase cyan in a green component of an image while leaving the cyan in the blue component unaltered.

The invention contemplates the use of any CIEE, or equivalent functionality that may alleviate the need for the use of a CIEE, that may be in place today or may be developed in the future, for steps 108 and/or 110. For example, the present invention contemplates utilizing the reduction of system noise, the measurement of and/or calculations of appropriate variables, and the development of more sophisticated color image editing functionality to allow this step to be automated. For example, aspects of the present invention contemplate automatic calculations being performed by functionality from a CIEE or equivalent functionality that may alleviate the need for the use of a CIEE in response to PDCCFs provided as input to such functionality. One example of an alternative to a traditional CIEE, whose principal objective is to allow an operator using the CIEE to change the appearance of an image, is software, firmware, hardware, or a combination thereof that may be used in conjunction with teachings of the present invention to provide color transformations using PDCCFs and any necessary secondary PDCCFs so that graphic image data may be properly printed in a production print job.

An additional, optional step may include the use of selected samples to provide error correction. For example, CODSs as discussed in conjunction with FIG. 2 may provide additional PDCCF data that may be used to identify errors in corrections applied with the use of a CIEE. Such an advantage may provide guidance in detecting overlapping correction anomalies between the neutral color family and other color families that may be larger than an acceptable or desired tolerance or threshold. Such threshold may be predetermined or dynamically set. For example, the CIEE is used to provide the increase or decrease as described above using an applicable PDCCF for the neutral family and a color family such as the red family. Any change in the applicable CODSs created by this increase or decrease is compared to a PDCCF calculated for the applicable CODSs. If the deviation from this calculated PDCCF is larger than the desired threshold, adjustments may be made to the applicable PDCCF for the neutral family, the color family of interest, or both, and step 108 may be repeated. If the deviation may not be made within some tolerance, an adjustment may be made that provides an acceptable deviation. One example for such a threshold is +/−3% of an IPDV designated as the Control.

In step 110, a CIEE transformation based on the CIEE transformation set-up, provided in step 108 may be applied by using any suitable CIEE functionality. The altered image data from this process may be saved in a separate file, or dynamically applied to a computer graphic image file's value at CTP plate making prior to a print production run. For example, in lithographic offset printing, this transformation may be applied at the CTP platemaking phase of print production to provide CMYK printing plates, as discussed below. All value levels of each C, M, Y, or K channel in the file, (e.g., 90%, 75%, 50%, 25%, 10%, 5%, and any other percentage dot value between 100% and 0.0%) may be adjusted by this transformation by means of interpolation to a desired pixel value. As technology permits, performance of this step may be altered to accommodate equivalent functionality that may alleviate the need for the use of a CIEE. In other words, this step or steps may be performed by functionality that transforms graphic image data using PDCCFs and secondary PDCCFs so that the transformed graphic image data may then be printed in a production print job. Depending on the implementation, step 112 may be performed on-the-fly directly after step 106, after a single step 108, or after one or more alternative steps 108 and/or 110 that may use PDCCFs to adjust a graphic image file's values so that the appearance of the image to be produced with a colorant set used to produce a CP would substantially correspond with the appearance of the image reproduced with a colorant set used to produce a RP.

In step 112, the transformed graphic image data created in step 110 may then be printed in a production print job to create a production run image on the printing press whose appearance will more closely approximate that of a proof of the image than if the transformation had not been performed. As one example, each of the screened or tonal percent dot values (e.g., 90%, 75%, 50%, 25%, 10%, 5%, and any other percentage dot value between 100% and 0.0%) for each of CMYK may represent transformed graphic image data. This data represents adjusted percent dot values for press output data whose targeted density values provide an appearance that approximately corresponds to the appearance of density values of a proof of a production image representative of the RP. In other words, a production image printed with these adjusted percent dot values will have density values that more closely approximate the originally-intended density values of a proof of the production image. This process provides more accurate printing than conventional systems, is substantially substrate-influence-independent, and may use several different proofing devices.

These adjustments may be made by, for example, providing the adjustment or the adjusted value to one of a number of well-known computer-driven devices that may be used to create CTP plates or film negatives or positives. For example, although traditional systems utilize computers that are currently standalone from a printing device and CTP platemaking devices that are standalone from a printing device, the invention also contemplates the use of networked systems that incorporate modern data processing and transfer capabilities, and where these adjusted values may automatically be electronically provided to any CTP platemaking device now known or developed in the future. As one example, direct imaging methods may be used to rewrite cylinders while on the press output device. Thus, CIEE functionality may reside in one or more elements that are electronically connected to a printing device, standalone from the printing device, and/or remotely located from the printing device. These adjustments may be applied to data to be used to print on the printing press adjusted dot values that approximately correspond to intended density values. For example, these adjustments may be saved into an adjustments file, applied to an existing data file, applied on-the-fly as the production print job is performed, or a combination of the above.

This image data may be stored and/or used to create data in a computer file that is used to create CTP plates. Although this description refers to CTP plates or CTP technology for convenience, the invention also contemplates the use of methods other than CTP plates that may be used to print a production job such as direct imaging (e.g., direct computer-to-cylinder master imaging), the use of interim films, and others. The printing plates may then be mounted on the press' cylinders and used to print the transformed graphic images on the printing press. At this phase of production, applicable CGDAFs may also be applied as required to expand the color gamut of the production print run's colorant set.

FIG. 2 illustrates an example of a SADF 200 that may be used in accordance with teachings of the present invention. SADF 200 may be used to provide a profile of information that may be used to more accurately define a second colorant set to be used with a second RM/CRS when compared to a first colorant set to be used with a first RM/CRS. In one embodiment, these profiles may be used to more accurately define the output of a printing press and/or a proofing device. For example, color density measurement data of a SADF 200 that is printed by a printing press may be compared to color density measurements taken from a SADF 200 that is output by a proofing device. Adjustments may then be made in response to the comparison so that use of a colorant set used to create a CP (or a subsequently derived colorant set) will provide an appearance of an image using the colorant set used that more closely match the appearance of an image with a colorant set used to produce the RP. In one embodiment, adjustments may be made to facilitate use of colorants in a printing press' output more closely matching those used in a proofing device.

In general, SADF 200 may be used to quantify printing characteristics of selected values in aspects of the color management process. The SADF may be provided in one of many electronic data formats and may be printed using a proofing device and/or a printing press. One such format may be a digital EPS computer graphics file format that may be used to create four CTP CMYK plates representing the SADF. SADF 200 includes a plurality of color control regions or color samples 1000–5257, each of which includes a region of solid color density (i.e., 100 percent dot or solid region) and one or more screened, or tonal, regions (e.g., 5, 10, 25, 50, 75, 90 percent dot). Examples for these percent dot values are illustrated in Tables II–IV. Of course, other percent dot values may be established as needed, whether predetermined or dynamically, and fewer or more regions may be used. In a particular embodiment, each of the printed regions may measure at least 3 mm across so that density values may be accurately measured. These shapes and sizes of these regions may vary according to the application, and their size may be reduced as technology improves. As one example, they may be regularly-shaped, such as a square or circle, or irregularly shaped.

In a particular embodiment, a SADF 200 includes a plurality of Tone Reproduction Color Samples (TRCSs), and a plurality of Color Correction Color samples (CCCSs), System Noise Indicator Samples (SNISs), and/or Correction Overlap Detection Samples (CODS), each arranged by color families. Some or all of these samples may be arranged so that they may be printed on a substrate such as paper in columns 220, 222, 224, 226, 228, 230, 232, ... 250 between a first side 201 and a second side 203 as illustrated in FIG. 2. These columns each may be generally aligned with a first axis 202 and may be separated by a lateral spacing 206. First axis 202 is, as illustrated in FIG. 2, generally parallel to a press output path, while second axis 204 is generally perpendicular to the press output path.

It may be advantageous for CCCSs and/or SNISs to be reproduced under conditions that are similar to those under which the applicable TRCSs are produced, including ink-film thickness and tone reproduction characteristics. By proximately locating CCCSs and/or SNISs of one color family in a column laterally near those TRCSs with a predetermined lateral spacing, similar printing conditions may be observed for these samples. This positioning may be advantageous because, among other things, it may reduce the variation of the ink film thickness that may increase the similarity of conditions between the types of samples. Such precision and control allows more accuracy in creating 1022 that represent solid (i.e., 100% dot) C, M, Y, and K. In addition, TRCSs also includes 5, 10, 25, 50, 75, and 90 percent dot control set points for each of CMYK.

TABLE III

Examples for TRCSs Percent Dot Values

| 1000 |   | 0%   |      |   |      |      |   |      |      |   |      |
|------|---|------|------|---|------|------|---|------|------|---|------|
| 1001 | C | 100% | 1008 | M | 100% | 1015 | Y | 100% | 1022 | K | 100% |
| 1002 | C | 90%  | 1009 | M | 90%  | 1016 | Y | 90%  | 1023 | K | 90%  |
| 1003 | C | 75%  | 1010 | M | 75%  | 1017 | Y | 75%  | 1024 | K | 75%  |
| 1004 | C | 50%  | 1011 | M | 50%  | 1018 | Y | 50%  | 1025 | K | 50%  |
| 1005 | C | 25%  | 1012 | M | 25%  | 1019 | Y | 25%  | 1026 | K | 25%  |
| 1006 | C | 10%  | 1013 | M | 10%  | 1020 | Y | 10%  | 1027 | K | 10%  |
| 1007 | C | 5%   | 1014 | M | 5%   | 1021 | Y | 5%   | 1028 | K | 5%   |

SADPs and therefore more accurate comparison of a CP and an RP, and thus more accurate matching of the appearance of a press output to that of a proof. This provides the advantage of reducing errors in calculations of TPDVs and PDCCFs that may be as high as 3% with the use of traditional methods and data or test forms. Errors may also be reduced by organizing such samples on an axis generally parallel to the output of a printing press and providing repetitive sample sets from which a statistical representation such as averaging may be performed for TRCSs may also improve results. In a particular embodiment, the centers of the color samples may advantageously span a distance less than or equal to 25 mm. Similarly, the predetermined lateral spacing varies with the size of the color samples in SADF 200, and in some embodiments may be, for example, 25 mm. Lateral spacing 206 may also be dynamically determined. As one example, TRCSs control set points 1000–1057 and 1200–1257 are illustrated as laterally proximate to CCCSs contorl set points 1100–1123.

In this embodiment, the seven traditional color families, neutral, red, yellow, green, cyan, blue and magenta are used. Percent dot values for corner samples for each of these families are illustrated in TABLE II. Comer samples are defined as six of the eight vertices red, yellow, green, cyan, blue and magenta (the other vertices are black and white) of a standard color model defined as a cube having its dimensions defined for three axes, one for each of C, M and Y. The neutral family includes an oval-shaped area within the cube centered about an axis between the black and white vertices, and has two corner samples which are achieved with equal contribution from the C, M and Y channels as illustrated in Table II. The cube is defined from percent dot values for each of C, M and Y between 0–100%.

TABLE II

Examples for Corner Samples Percent Dot Values

|         | C   | M   | Y   |
|---------|-----|-----|-----|
| Neutral | 100 | 100 | 100 |
| Neutral | 0   | 0   | 0   |
| Red     | 0   | 100 | 100 |
| Yellow  | 0   | 0   | 100 |
| Green   | 100 | 0   | 100 |
| Cyan    | 100 | 0   | 0   |
| Blue    | 100 | 100 | 0   |
| Magenta | 0   | 100 | 0   |

TRCSs include control set points 1000–1028, which includes a 0% dot control set point (i.e., no ink applied to the substrate) 1000, and control set points 1001, 1008, 1015, and In this embodiment, SADF 200 includes a plurality of TRCSs, with control set points 1000–1057. In this embodiment, values as discussed for control set points 1000–1028 are repeated for control set points 1029–1057. Values for control set points 1000–1057 are then repeated for control set points 1200–1257, 1400–1457, 1600–1657, 1800–1857, 2000–2057, . . . , 5200–5257. It may in some cases be advantageous for TRCSs to be positioned proximally near a plurality of CCCSs and CODs. These TRCSs may then be used to accommodate for any variation in ink-film thickness in a CP such as one printed on a printed press. In a particular embodiment, samples 1022–1028 may or may not be included or used, depending on the application CCCSs includes solid and screened areas of multi-dimensional color samples. In a particular embodiment, a SADF 200 includes a plurality of all CCCSs arranged by color family. In this embodiment, CCCSs includes color samples 1100–1123 in the neutral family, 1300–1319 for the red family, 1507–1524 for the yellow family, 1700–1719 for the green family, 1907–4924 for the cyan family, 2100–2119 for the blue family, and 2307–2324 for the magenta family. CCCSs may include additional control set points for one or more of these families repeated across SADF 200. For example, the SADF may also include control set points 2500–2523 and 3900–3923 in the neutral family, in addition to other samples (not explicitly shown) that are repeated for each of the color families and to include control set points 5107–5124 for the magenta family.

CCCSs include overprints of two or more colorants C, M, Y, and K. These values may vary as desired, and more or fewer values may be used, depending on the application. As one example, for the neutral family, CCCSs control set point 1100 may include CMYK initial percent dot values (IPDVs) of 5,5,5,0 respectively, control set point 1101 may include CMYK IPDVs of 10, 10, 10, 0 respectively, control set point 1102 may include CMYK IPDVs of 25, 25, 25, 0 respectively, and control set point 1103 may include CMYK IPDVs of 50, 50, 50, 0 respectively. For the red family, CCCSs control set point 1300 may include CMYK IPDVs of 0, 100, 100, 0 respectively, control set point 1301 may include CMYK IPDVs of 0, 90, 90, 0 respectively, control set point 1307 may include CMYK IPDVs of 90, 100,100,0 respectively, and control set point 1313 may include CMYK IPDVs of 0, 100,100,100 respectively. The remaining color families include various combinations of C, M, Y, and/or K as desired. One exemplary set of CCCSs that may be used in accordance to teachings of the present invention is illustrated in Table IV. Many of the samples shown in Table IV may or may not be used, depending on the application. These samples delineate CMY, & K values as "X."

TABLE IV

Examples for Percent Dot Values that may be used in a SADF

| Color Smpls | C M Y K Percent Dot Values |
|---|---|
| 1100 | 5 5 5 0 |
| 1101 | 10 10 10 0 |
| 1102 | 25 25 25 0 |
| 1103 | 50 50 50 0 |
| 1104 | 75 75 75 0 |
| 1105 | 90 90 90 0 |
| 1106 | 100 100 100 0 |
| 1107 | 5 5 5 0 |
| 1108 | 10 10 10 0 |
| 1109 | 25 25 25 0 |
| 1110 | 50 50 50 0 |
| 1111 | 75 75 75 0 |
| 1112 | 90 90 90 0 |
| 1113 | 100 100 100 0 |
| 1114 | 5 5 5 0 |
| 1115 | 10 10 10 0 |
| 1116 | 25 25 25 0 |
| 1117 | 50 50 50 0 |
| 1118 | 75 75 75 0 |
| 1119 | 90 90 90 0 |
| 1120 | 100 100 100 0 |
| 1121 | 25 25 25 25 |
| 1122 | 50 50 50 50 |
| 1123 | 75 75 75 75 |
| 1124 | X |
| 1125 | X |
| 1126 | X |
| 1127 | X |
| 1128 | X |
| 1300 | 0 100 100 0 |
| 1301 | 0 90 90 0 |
| 1302 | 0 75 75 0 |
| 1303 | 0 50 50 0 |
| 1304 | 0 25 25 0 |
| 1305 | 0 10 10 0 |
| 1306 | 0 5 5 0 |
| 1307 | 90 100 100 0 |
| 1308 | 75 100 100 0 |
| 1309 | 50 100 100 0 |
| 1310 | 25 100 100 0 |
| 1311 | 10 100 100 0 |
| 1312 | 5 100 100 0 |
| 1313 | 0 100 100 100 |
| 1314 | 0 100 100 90 |
| 1315 | 0 100 100 75 |
| 1316 | 0 100 100 50 |
| 1317 | 0 100 100 25 |
| 1318 | 0 100 100 10 |
| 1319 | 0 100 100 5 |
| 1320 | 67 100 100 0 |
| 1321 | 50 75 75 0 |
| 1322 | 33 50 50 0 |
| 1323 | 17 25 25 0 |
| 1324 | X |
| 1325 | X |
| 1326 | X |
| 1327 | X |
| 1328 | X |
| 1500 | 0 0 100 0 |
| 1501 | 0 0 90 0 |
| 1502 | 0 0 75 0 |
| 1503 | 0 0 50 0 |
| 1504 | 0 0 25 0 |
| 1505 | 0 0 10 0 |
| 1506 | 0 0 5 0 |
| 1507 | 90 0 100 0 |
| 1508 | 75 0 100 0 |
| 1509 | 50 0 100 0 |
| 1510 | 25 0 100 0 |
| 1511 | 10 0 100 0 |
| 1512 | 5 0 100 0 |
| 1513 | 0 90 100 0 |
| 1514 | 0 75 100 0 |

TABLE IV-continued

Examples for Percent Dot Values that may be used in a SADF

| Color Smpls | C M Y K Percent Dot Values |
|---|---|
| 1515 | 0 50 100 0 |
| 1516 | 0 25 100 0 |
| 1517 | 0 10 100 0 |
| 1518 | 0 5 100 0 |
| 1519 | 0 0 100 90 |
| 1520 | 0 0 100 75 |
| 1521 | 0 0 100 50 |
| 1522 | 0 0 100 25 |
| 1523 | 0 0 100 10 |
| 1524 | 0 0 100 5 |
| 1525 | X |
| 1526 | X |
| 1527 | X |
| 1528 | X |
| 1700 | 100 0 100 0 |
| 1701 | 90 0 90 0 |
| 1702 | 75 0 75 0 |
| 1703 | 50 0 50 0 |
| 1704 | 25 0 25 0 |
| 1705 | 10 0 10 0 |
| 1706 | 5 0 5 0 |
| 1707 | 100 90 100 0 |
| 1708 | 100 75 100 0 |
| 1709 | 100 50 100 0 |
| 1710 | 100 25 100 0 |
| 1711 | 100 10 100 0 |
| 1712 | 100 5 100 0 |
| 1713 | 100 0 100 100 |
| 1714 | 100 0 100 90 |
| 1715 | 100 0 100 75 |
| 1716 | 100 0 100 50 |
| 1717 | 100 0 100 25 |
| 1718 | 100 0 100 10 |
| 1719 | 100 0 100 5 |
| 1720 | 100 67 100 0 |
| 1721 | 75 50 75 0 |
| 1722 | 50 33 50 0 |
| 1723 | 25 17 25 0 |
| 1724 | X |
| 1725 | X |
| 1726 | X |
| 1727 | X |
| 1728 | X |
| 1900 | 100 0 0 0 |
| 1901 | 90 0 0 0 |
| 1902 | 75 0 0 0 |
| 1903 | 50 0 0 0 |
| 1904 | 25 0 0 0 |
| 1905 | 10 0 0 0 |
| 1906 | 5 0 0 0 |
| 1907 | 100 90 0 0 |
| 1908 | 100 75 0 0 |
| 1909 | 100 50 0 0 |
| 1910 | 100 25 0 0 |
| 1911 | 100 10 0 0 |
| 1912 | 100 5 0 0 |
| 1913 | 100 0 90 0 |
| 1914 | 100 0 75 0 |
| 1915 | 100 0 50 0 |
| 1916 | 100 0 25 0 |
| 1917 | 100 0 10 0 |
| 1918 | 100 0 50 0 |
| 1919 | 100 0 0 90 |
| 1920 | 100 0 0 75 |
| 1921 | 100 0 0 50 |
| 1922 | 100 0 0 25 |
| 1923 | 100 0 0 10 |
| 1924 | 100 0 0 5 |
| 1925 | X |
| 1926 | X |
| 1927 | X |
| 1928 | X |
| 2100 | 100 100 0 0 |

TABLE IV-continued

Examples for Percent Dot Values that may be used in a SADF

| Color Smpls | C M Y K Percent Dot Values |
|---|---|
| 2101 | 90 90 0 0 |
| 2102 | 75 75 0 0 |
| 2103 | 50 50 0 0 |
| 2104 | 25 25 0 0 |
| 2105 | 10 10 0 0 |
| 2106 | 5 5 0 0 |
| 2107 | 100 100 90 0 |
| 2108 | 100 100 75 0 |
| 2109 | 100 100 50 0 |
| 2110 | 100 100 25 0 |
| 2111 | 100 100 10 0 |
| 2112 | 100 100 5 0 |
| 2113 | 100 100 0 100 |
| 2114 | 100 100 0 90 |
| 2115 | 100 100 0 75 |
| 2116 | 100 100 0 50 |
| 2117 | 100 100 0 25 |
| 2118 | 100 100 0 10 |
| 2119 | 100 100 0 5 |
| 2120 | 100 100 67 0 |
| 2121 | 75 75 50 0 |
| 2122 | 50 50 33 0 |
| 2123 | 25 25 17 0 |
| 2124 | X |
| 2125 | X |
| 2126 | X |
| 2127 | X |
| 2128 | X |
| 2300 | 0 100 0 0 |
| 2301 | 0 90 0 0 |
| 2302 | 0 75 0 0 |
| 2303 | 0 50 0 0 |
| 2304 | 0 25 0 0 |
| 2305 | 0 10 0 0 |
| 2306 | 0 5 0 0 |
| 2307 | 90 100 0 0 |
| 2308 | 75 100 0 0 |
| 2309 | 50 100 0 0 |
| 2310 | 25 100 0 0 |
| 2311 | 10 100 0 0 |
| 2312 | 5 100 0 0 |
| 2313 | 0 100 90 0 |
| 2314 | 0 100 75 0 |
| 2315 | 0 100 50 0 |
| 2316 | 0 100 25 0 |
| 2317 | 0 100 10 0 |
| 2318 | 0 100 5 0 |
| 2319 | 0 100 0 90 |
| 2320 | 0 100 0 75 |
| 2321 | 0 100 0 50 |
| 2322 | 0 100 0 25 |
| 2323 | 0 100 0 10 |
| 2324 | 0 100 0 5 |
| 2325 | X |
| 2326 | X |
| 2327 | X |
| 2328 | X |

CCCSs includes a subset of color samples that have been selected from the 4,096 sample combinations possible using 8 control set points for each of C, M, Y, and K. In a particular embodiment, this subset may be tailored to be used with select CIEEs that may be used to perform subsequent adjustments and/or calculations. The invention contemplates the use of CIEEs that may be used to control and/or monitor control set points as desired, such as for percent dot values other than 5, 10, 25, 50, 75, 90 and 100.

Also in a particular embodiment, CODs include solid and screened areas of multi-dimensional color samples. In a particular embodiment, a SADF 200 includes a plurality of all CODs arranged by RGB color families. In this embodiment, CODs include control set points 1320–1323 for the red family, 1720–1723 for the green family, 2120–2123 for the blue family. CODs may include additional control set points for one or more of these families repeated across SADF 200. For example, the SADF may also include control set points 2720–2723 and 4120–4123 in the red family, which are not explicitly shown.

CODs may be described as samples having overprint values of two or more colorants C, M, Y, and K whose location on the color cube defined above are approximately midpoint between a color family's corner sample and the neutral family, and data collected from CODs may be used, among other things, to determined whether characteristics of the color image editing engine being used is creating any anomalies. For example, overlapping correction anomalies may be detected as adjustments are made during the methods described herein, and corrected as desired.

SNISs may in a particular embodiment include solid and screened areas of one-dimensional color samples in the C, M, and Y families. SNISs may be used in a particular embodiment to determine whether system noise, such as variations in ink film thickness and/or tone reproduction characteristics, is present in the process of calculating PDC-CFs. As illustrated in Table IV, samples 1500–1506, 1900–1906, and 2300–2306 may in a particular embodiment be SNISs. Alternatively or in addition, these SNISs may include the same component CMYK values for relative neighboring TRCSs. Relative neighboring values refers to samples in neighboring columns. That is and for example, SNISs 1500–1506 in column 230 may include the same CMYK component values as TRCSs 1415–1421 and 1615–1621, which are in columns 228 and 232, respectively. Ideally, the values for IPDVs should be the same for SNISs and their relative neighboring TRCSs. In other words, PDC-CFs for the SNISs should approximately equal 0.0, where no system noise is present.

In a particular embodiment, the SADF includes 1,276 TRCSs arranged in 22 columns of 58 control set points. Similarly, in a particular embodiment, the SADF may include 36 CODSs that are arranged in 4 color samples for each of the red, green and blue families, and 414 CCCSs that include 24 for the neutral family, 20 each of red, green, and blue families and 18 for each of the C, M, and Y families. Alternatively or in addition, the SADF may include 63 SNISs that may be arranged in 7 color samples for each of the C, M, and Y families. Each of these samples in the SADF may be repeated where the columns for the neutral, C, M, and Y and/or red, green and blue families are repeated, as previously discussed.

Such repetition of samples within SADF 200 may advantageously provide a number of measurements that may be taken for the same color family. A statistical representation such as an average may then be made for selected values within a color family, such as TPDVs, as desired. Use of the statistical representation may advantageously reduce system noise and/or inaccuracies in measurements, calculations, and/or other effects from causes such as variations in ink-film thickness and/or tone reproduction characteristics.

Although control set points 1000–1028 are set at 0, 5, 10, 25, 50, 75, 90, and 100 percent dot in a preferred embodiment, alternative control set point percent dot values may be established as needed. Current 8-bit pixel depth digital imaging provides for a total of 256 percent dot gradations from 100% dot (i.e., solid area) to 0% dot (i.e., substrate); therefore, using 8-bit pixel depth digital imaging permits 0.4% between successive percent dot gradations even when less than the 256 potential gradations are used as control set points. In a particular embodiment, interpolation may be used to calculate an adjustment to be applied to each of the 256 percent dot gradations. These samples may be referenced visually and by instrument measurement, which facilitates employment of quality control, statistical process control, and ISO 9000 certification required procedures.

The density values measured from the SADF may be saved in a variety of formats, preferably into a digital or other representation on a computer-readable storage medium, into one or more SADPs. Numerous formats for groupings for the RP and the CP may be selected as control and/or non-control components as discussed below in conjunction with FIG. 4. Each RP and CP SADP may also include values calculated and/or derived from these density values, including TPDVs, PDCCFs, any desired secondary PDCCFs and/or CGDAFs. Alternatively or in addition, a single SADP file may be created that includes both reference and current data sets if combining both data sets into a single unit is desired.

Figure 3:
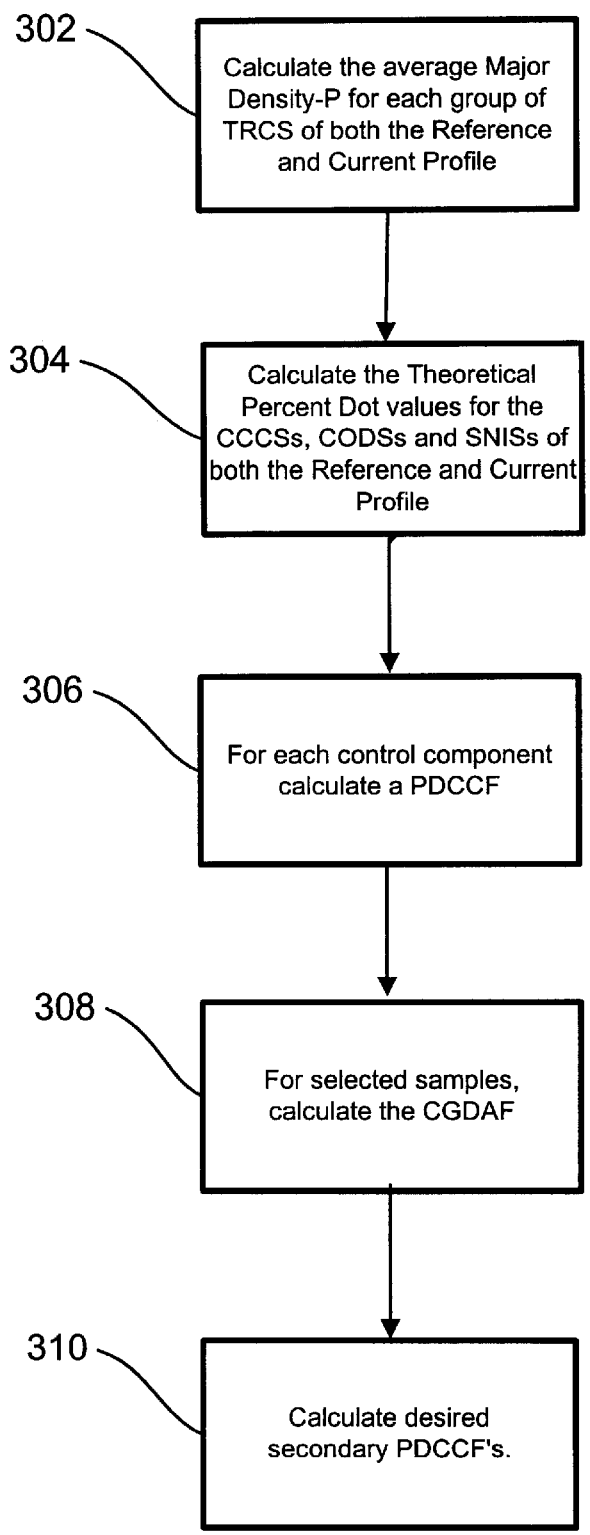
FIG. 3 is an example of a method for providing Color Gamut Density Adjustment Factors (CGDAFs) in accordance with teachings of the present invention.

FIG. 3 illustrates an example for calculating PDCCFs and CGDAFs. Generally, the method includes the steps of calculating average density values from each TRCSs value in both the RP and CP, calculating TPDVs for the CCCSs, CODS and SNISs in both the RP and the CP, and calculating applicable PDCCFs. PDCCFs are adjustment values that may be used in adjusting image data produced with a colorant set used to produce the CP so that the appearance of the production print image would substantially correspond with the appearance of the image reproduced with a colorant set used to produce the RP. The method also may include calculating an applicable CGDAF, which may be used to calculate densities that correspond to a larger than 100% dot value to expand the color gamut of the CP to fit the color gamut of the RP.

In step 302, density values for selected TRCSs may be utilized for both the CP and the RP. In a particular embodiment, this step may include selecting a color family of the SADF as a color family of interest (CFOI), and then selecting a CCCSs, CODS, or SNIS of the designated CFOI as a sample of interest (SOI). In a particular embodiment, it may be advantageous to use TRCSs data adjacent to the designated CFOI. Such an advantage may provide more accurate calculations of TPDVs, PDCCFs, desired secondary PDCCFs, and/or CGDAFs, by reducing effects from variations in density measurements due to factors such as uneven ink-film thickness and/or tone reproduction characteristics. Steps 304–308 may be performed for all CCCSs, CODs, and SNISs for all color families by performing the steps for each selected SOI and CFOI.

In step 304, a first SADP may be designated as a Reference Profile (RP), and a second SADP may be designated as a Current Profile (CP). Generally, density measurements may be obtained from the RP and CP to calculate TPDVs for each SOI in the RP and CP. Interpolated density values may then be obtained from the CP and the RP by using standard linear and other interpolation techniques. PDCCFs for each control component are then calculated in response to these TPDVs in step 306. One example for calculating PDCCFs is discussed in further detail in conjunction with FIG. 4, and includes designating C, M, Y, and/or K control components for a file channel. Generally, where a control component is designated, other components become non-control components.

In step 308, a CGDAF is calculated for selected CCCSs. For example, if the sum of a PDCCF and its corresponding IPDV exceeds 100 percent, then the AFPDV may be set to 100 percent, and a CGDAF is calculated to allow for calculating a density that corresponds to a larger than 100% dot value. A CGDAF may be applied (added, in one embodiment of the invention) to the RP's Solid Major Density–P Aimpoints to be used as the CP's Solid Major Density–P Aimpoints in a production run, so that the press may be run using such higher densities. Such higher densities may be achieved using colorants containing higher concentrations of pigments or dyes, by applying colorants at higher ink-film thicknesses, or a combination thereof. The neutral family is generally not affected by the use of CGDAFs as a result of the printing industry practice of "under-color removal" to control "total area coverage." Generally, calculation of CGDAFs may provide the advantage of reducing or removing the compromises that are typically found with ICC color management systems, which attempt to gamut map using either photometric or colorimetric corrections. Moreover, the present invention contemplates that this method may calculate densities to be used with a printing device, which usually has a smaller color gamut, to those to be used with a proofing device, which usually has a larger color gamut, a solution that may provide fewer restrictions on providing output image data using a printing device. One example for calculating a CGDAF is as follows.

$CGDAF$=Targeted Control Solid Major Density Aimpoint*$PDCCF$* (Reference Control $TPDV$/Current Control $TPDV$)

In step 310, any desired secondary PDCCFs are calculated to properly reduce or remove any overcompensation effects. For example, secondary PDCCFs may be advantageously used, when proper compensation for a particular color channel's applicable color family with the most underefficiency overcompensates, by application of the CP's Targeted Solid Major Density–P Aimpoints for the channel, in the other two applicable families having the least underefficiency. Applicable color families for the Magenta channel are magenta, red, and blue; for the Yellow channel, red, yellow, and green; and for the Cyan channel, cyan, green and blue. Secondary PDCCFs are negative values that may be used to reduce respective 100% IPDVs, usually at selected corner samples, to balance the effect of the application of CGDAFs on the applicable color families. As one example, a CGDAF may be selected as the highest of the three CGDAFs calculated for the Magenta channel at the corner sample point for the red, blue and magenta families. Where the blue family is the least efficient of the applicable families and would require application of the highest CGDAF, such CGDAF calculated for the Magenta channel would overcompensate for the red family, which is not as underefficient as the blue family. A secondary PDCCF may then be derived for the Magenta channel to produce AFPDVs for the 100% IPDVs for each of the red and magenta families with lower CGDAFs. Other values, such as those for the 91–99 percent dot values, may be derived using numerous methods, including interpolation. Secondary PDCCFs may be represented as:

$$SecondaryPDCCF =$$

$$\left(\left(\frac{\begin{pmatrix}\text{(Targeted Solid Major Density Aimpoint for Cyan}("Tcyan")\\ CGDAF \text{ for Cyan in the Green Family }("CGDAFgreen") - \\ \text{Cyan Density at a 90\% control set point of}\\ TRCS \text{ ("90\% Value")}\end{pmatrix}}{\left(T_{cyan} + CGDAF \text{ for Cyan in the Blue Family} - 90\% \text{ Value}\right)}\right) * 10\right) - 10$$

The term "90% Value" may be derived using a number of different methods including averaging any desired number of TRCS 90% control set points, or using a single value, e.g. TRCS control set point 1002. To illustrate another example using the blue and green families as measured in the Cyan channel, a CGDAF is derived in response to a PDCCF derived at the corner sample point of the blue family and selected as the highest of values recorded. Where, in such a scenario, the derived CGDAFs are 0.075 and 0.110 respectively for the green and blue families, the green corner sample in the Cyan channel may preferably be reduced by a calculated secondary PDCCF value. Thus, using examples for values discussed above, a secondary PDCCF may be represented as:

$$\text{Secondary } PDCCF = \left(\left(\frac{(1.60+0.075)-90\% \text{ Value}}{(1.60+0.110)-90\% \text{ Value}}\right)*10\right)-10$$

Figure 4:
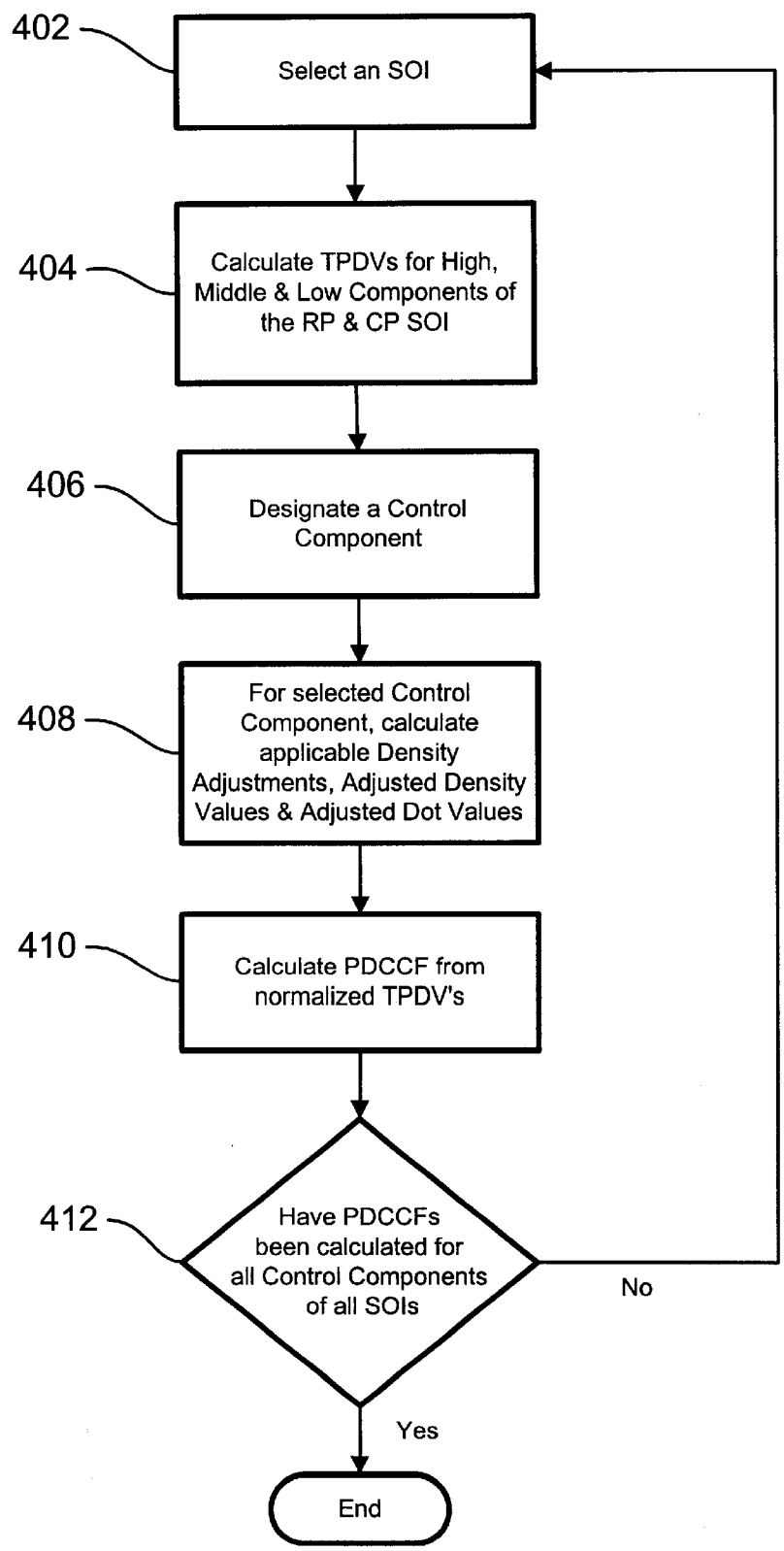
FIG. 4 is an example of a method for providing Percent Dot Color Correction Factors in accordance with teachings of the present invention.

FIG. 4 illustrates an example of a method for calculating PDCCFs. Generally, the method includes calculating TPDVs for each color sample for both a RP and a CP, and then calculating density adjustments and adjusted density values to the TPDVs in response to these density adjustments. The method then calculates in response to the adjusted density values adjusted percent dot values from which PDCCFs are calculated. Such calculations provide the advantage of compensating for differences between RM/CRSs with different additivity failure characteristics using multiple colorant sets, for a variety of printing, proofing and/or press output devices.

The method begins in step 402, where a SOI is selected. In step 404, TPDVs are calculated for High, Middle and Low Components for the SOI. TPDVs may be described as the dot values that are derived from the actual measured densities from the SOI. In a particular embodiment, the method uses iteration and techniques such as linear or other interpolative techniques to arrive at dot values that correspond to measured C, M, Y densities.

TPDVs may then be calculated for the CCCSs, CODSs, and SNIS of both the RP and the CP by using applicable TRCSs data. For example, density measurements may be obtained from the RP and CP to calculate TPDVs for each of these CCCSs, CODSs, and SNISs in the profile. In a particular embodiment, a statistical representation, such as an average, of a plurality of samples may be calculated. For example, an average or other statistical representation of three TPDVs or PDCCFs may be performed around a specific color family. As one example, for the neutral family of CCCSs control points 1100–1123, TPDVs may be calculated from averaged density values for TRCSs control set points 1000–1057 and 1200–1257. To illustrate, an average density for TRCSs solid cyan control set point major density values applicable to the neutral family of CCCSs control points 1100–1123 may be calculated from density values measured for TRCSs control set points 1001,1201, 1030 and 1230. This process may also be expanded to include TPDV and PDCCF values calculated for the neutral family of CCCSs control points 2500–2523 and 3900–3923. The present invention contemplates the use of such statistical representations in a number of configurations as desired, and may be used to reduce the effects from system noise as measurements and calculations are taken from the SADF.

For example, a statistical representation such as an average density of the substrate for each C, M, and Y component of the SOI may be subtracted from the density measured for each component of the sample to arrive at a '–P' density value for each of C, M, and Y. The component with the highest density is selected as a High Component. For example, for sample 1310, the highest density is magenta, the next-highest density is yellow, and the lowest density is cyan. A Start Percent Dot Value (SPDV) for the High Component may be interpolated by comparing the density of the High Component to the tone reproduction densities for that colorant. The component with the next-highest density is selected as a Middle Component, for which a density value may be interpolated from the tone reproduction densities for the colorant of the High Component. A SPDV for the Middle Component may then be interpolated using the difference of the density calculated for the Middle Component and the original density of the Middle Component. A SPDV for the Low Component may be interpolated by calculating densities from the High and Middle Component percent dot values and subtracting those from the original density of the Low Component. This process results in SPDVs for each of the High, Middle and Low Components.

TPDV's may then be calculated using a variety of methods, including iteration to within a desired tolerance. For example, in one embodiment, for all three calculated percent dot values, densities may be calculated for all three components. These densities may then be summed to create a total density for each of the three components. For each component an Adjustment Factor may then be calculated. This Adjustment Factor may be represented as:

Adjustment Factor=Actual–$P$ density/total density

In a particular embodiment, a first calculation may be represented as TPDV=SPDV*Adjustment Factor. Subsequent new values for TPDV are iteratively calculated until the adjustment factors are within a desired tolerance. For example, the method may end where all three of the adjustment factors, when rounded, equal 1.0.

In steps 406–412, these TPDVs are then used to calculate PDCCFs, and the RP's TRCSs are used to interpolate percent dot values and densities for both the RP and the CP. In step 406, a control component is selected for which steps 408 and 410 are performed. The control component is used in this aspect of the algorithm to determine for which dot value a normalization may be calculated (e.g., C, M, or Y). In a particular embodiment, for CCCSs in the neutral family, only C, M, and Y are used as the control component in the method, whereas it is not necessary to perform any calculations using K as the control. On the other hand, C, M, Y, and K are all used as the control component in the method for CCCSs values in other families, where the K channel includes different dot values.

In step 408, a density adjustment is performed using selected density values that correspond to the non-control component dot values for the RP and the CP. The density of the control component is then adjusted by the density adjustment, and an adjusted dot value for the control component is calculated for the adjusted density of the control component.

First, the method may normalize the TPDV for the non-control components of the CP SOI using the TPDV of the non-control components of the RP SOI as a reference. Normalization may provide the advantage of compensating for the interdependency of the file channels from the adjustment process. Generally, for example, any adjustments to the C channel affect the M, Y, and/or K channel. Normalization compensates for these effects and isolates the selected file component (e.g., C, M, Y, and/or K) in the adjustment process.

The CP TPDV of the control component may then be adjusted in response to the normalization to create a CP Adjusted Control Theoretical Percent Dot Value (ACTPDV). An example may be illustrative. The following example uses Cyan as the Control component, and thus magenta and yellow are non-control components:

Density Adjustment=(Cyan Density of the Reference Magenta Dot Value−Cyan Density of the Current Magenta Dot Value)+(Cyan Density of the Reference Yellow Dot Value−Cyan Density of the Current Yellow Dot Value)

AdjustedCyanDensity=CyanDensityoftheCurrent-CyanDotValue+Density Adjustment

Adjusted Cyan Dot Value=Cyan Dot Value of the Adjusted Cyan Density

In step 410, a PDCCF is calculated in response to the CP ACTPDV and the RP TPDV of the control component.

PDCCF=Reference Cyan Dot Value−Adjusted Cyan Dot Value

Step 412 returns the method to step 402 to perform steps 404 and 410 for the other control components if the method has not been performed for all of the control components of all of the SOIs. Where TPDVs or other values have already been calculated, there is no need to recalculate these or any values.

It may be advantageous in some cases to modify the prior approach in calculating PDCCFs from TPDVs. For example, where the control component is Black, for the color families Yellow, Cyan and Magenta, the PDCCF may be obtained in response to calculations for multiple colors. In addition, where K is designated the control component for a file channel, the control component becomes a combination of one or more of C, M, Y, depending on the selection of CFOI.

Using this aspect of the algorithm, the color family, rather than the control component, is used to determine for which dot value the adjustment is being calculated (e.g., C, M, or Y). Again, an example using K as the Control component in the Cyan family may be illustrative:

Density Adjustment=(Magenta Density of the Reference Cyan Dot Value−Magenta Density of the Current Cyan Dot Value)

Adjusted Magenta Density=MagentaDensityofthe-CurrentMagentaDotValue+Density Adjustment Adjusted MagentaDotValue=MagentaDotValueofthe-AdjustedMagentaDensity Density Adjustment=(Yellow Density of the Reference Cyan Dot Value−Yellow Density of the Current Cyan Dot Value)

Adjusted Yellow Density=Yellow Density of the Current Yellow Dot Value+Density Adjustment AdjustedYellowDotValue=YellowDotValueoftheNorm-alizedYellowDensity PDCCF=(ReferenceMagentaDotValue+Reference-YellowDotValue)/2 (AdjustedMagentaDotValue+AdjustedYellowDotValue)/2

Two examples may be illustrative. For example, Table V illustrates values that are calculated for a neutral family where the first column includes values calculated for the RP, and the second column includes values calculated for the CP. The last entry in row F shows a comparison of the two system admixture characteristics. CCCS 1103 as used in Table V includes CMYK IPDVs of 50, 50, 50, 0 respectively, which are used to derive densities that may be compared to actual measured densities to determine, among other things, additivity failure evident in the systems used to create the CP and the RP. In this example, measured densities for CCCS 1103 are smaller than those densities for one-dimensional CMYK density values for corresponding dot values of 50, 50, 50, respectively. As illustrated in Table V, neighboring TRCS samples 1000–1021 and 1200–1221 are also used to provide one-dimensional values in row A. Calculations may be performed for the C, M, & Y channels without calculating any values for the K channel. In these cases, any adjustments to the K channel may be made in response to calculations performed for the C, M, & Y channels.

Referring to Table V, theoretical perfect efficiency densities shown in row B are sum totals of the addition of the densities shown in row A. In this example, because the actual densities as shown in row C are less than the efficiency densities shown in row B, the RP illustrates under-efficiency. TPDV's calculated in row D represent what dot values, in theory, should have been required to produce the densities in row C given perfect system efficiency. Row E illustrates the difference between the dot values shown in Rows A and D. Row F illustrates the difference between those percent dot values shown in Row D for the two profiles. In this example, these values are unrefined PDCCFs, prior to normalization. These values represent an absolute correction that is required on the CCCSs for the neutral family of colors for each of the C, M, and Y channels of an image data graphics file so that the appearance of the image to be produced in a production print job with a colorant set used to produce a CP would substantially correspond with the appearance of the image reproduced with a colorant set used to produce a RP.

TABLE V

Example for Neutral Family

| | | System Admixture Data Profile Designated as Reference | | | | | System Admixture Data Profile Designated as Current | | | |
|---|---|---|---|---|---|---|---|---|---|---|
| | | CCCSs Initial Percent Dot Values | TRCSs Density Measurements | | | | CCCSs Initial Percent Dot Values | TRCSs Density Measurements | | |
| | Colorant | (Neutral Family) | C | M | Y | Colorant | (Neutral Family) | C | M | Y |
| A | Cyan | 50 | .528 | .254 | .092 | Cyan | 50 | .519 | .229 | .082 |
| | Magenta | 50 | .114 | .563 | .372 | Magenta | 50 | .088 | .474 | .308 |
| | Yellow | 50 | .011 | .047 | .378 | Yellow | 50 | −.033 | .043 | .400 |
| | Black | 0 | .000 | .000 | .000 | Black | 0 | .000 | .000 | .000 |
| | C | | M | | Y | C | | M | | Y |
| B | .653 | | .864 | | .842 | .604 | | .746 | | .790 |
| C | .631 | | .804 | | .769 | .614 | | .734 | | .717 |
| D | 48.91% | | 45.95% | | 45.06% | 50.63% | | 49.15% | | 42.82% |
| E | −1.09% | | −4.05% | | −4.94% | +.63% | | −.85% | | −7.18% |
| F | −1.72% | | −3.20% | | +2.24% | | | | | |

TABLE VI illustrates examples of values that may be calculated for a red family where the first column includes values calculated for the RP, and the second column includes values calculated for the CP. The last entries in rows F and G show two comparisons of the two system admixture characteristics. CCCS 1300 as used in Table VI includes CMYK IPDVs of 0, 100, 100, and 0 respectively, which are used to derive densities that may be compared to actual measured densities to determine, among other things, additivity failure evident in the systems used to create the CP and the RP. As illustrated in Table VI, neighboring TRCS samples 1200–1221 and 1400–1421 are also used to provide one-dimensional values in row A.

Theoretical perfect efficiency densities shown in row B are sum totals of the addition of the densities shown in row A. In this example, because the actual densities as shown in row C, for the C and M channels, are greater than those efficiency densities shown in row B, the RP illustrates overefficiency. TPDV's calculated in row D represent what dot values, in theory, should have been required to produce the densities in row C given perfect system efficiency, that is, with no additivity failure. Row E illustrates the difference between the dot values shown in Rows A and D. Row F illustrates the difference between those percent dot values shown in Row D for the two profiles. In this example, these values are PDCCFs prior to the normalization process as discussed above. These values represent an absolute correction that is required on the CCCSs for the red family of colors for each of the C, M, and Y channels of an image data graphics file so that the appearance of the image to be produced in a production print job with a colorant set used to produce a CP would substantially correspond with the appearance of the image reproduced with a colorant set used to produce a RP. Row G illustrates CGDAFs that are calculated and that may be subsequently applied to the RP's Solid Major Density-P Aimpoints to be used as the CP's Solid Major Density-P Aimpoints in a production run.

TABLE VI

Example for Red Family

| | | System Admixture Data Profile Designated as Reference | | | | | System Admixture Data Profile Designated as Current | | | |
|---|---|---|---|---|---|---|---|---|---|---|
| | | CCCSs Initial Percent Dot Values | TRCSs Density Measurements | | | | CCCSs Initial Percent Dot Values | TRCSs Density Measurements | | |
| | Colorant | (Red Family) | C | M | Y | Colorant | (Red Family) | C | M | Y |
| A | Cyan | 0 | .000 | .000 | .000 | Cyan | 0 | .000 | .000 | .000 |
| | Magenta | 100 | .179 | 1.574 | .737 | Magenta | 100 | .176 | 1.713 | .815 |
| | Yellow | 100 | .020 | .084 | 1.075 | Yellow | 100 | −.003 | .084 | 1.295 |
| | Black | 0 | .000 | .000 | .000 | Black | 0 | .000 | .000 | .000 |
| | C | | M | | Y | C | | M | | Y |
| B | .199 | | 1.658 | | 1.812 | .173 | | 1.797 | | 2.11 |
| C | .205 | | 1.715 | | 1.738 | .174 | | 1.396 | | 1.627 |
| D | .42% | | 103.56% | | 95.29% | 1.52% | | 89.92% | | 81.84% |
| E | +.42% | | +3.56% | | −4.71% | +1.52% | | −10.08% | | −18.16% |
| F | −1.10% | | +13.64% | | +13.45% | | | | | |
| G | 0.00 | | +.252 | | +.224 | | | | | |

Using TABLE VI for illustrative purposes, row F shows an unnormalized PDCCF value for the magenta channel as +13.64 percent, or 0.1364. Assuming magenta is the control component, this PDCCF value may be multiplied by an exemplary Targeted Magenta Solid Major Density Aimpoint of 1.60 for the magenta channel. Reference Magenta TPDVs are what dot values, in theory, should have been required to produce the densities in row C given perfect system efficiency, that is, with no additivity failure. Although a CGDAF, as shown in row G, may be represented using a variety of formulas, one method for representing a CGDAF may be:

CGDAF=(Targeted Magenta Solid Major Density Aimpoint*PDCCF)* (Reference Magenta TPDV/ Current Magenta TPDV) CGDAF=1.60*0.1364* (103.56/89.92)=+0.252

Figure 5:
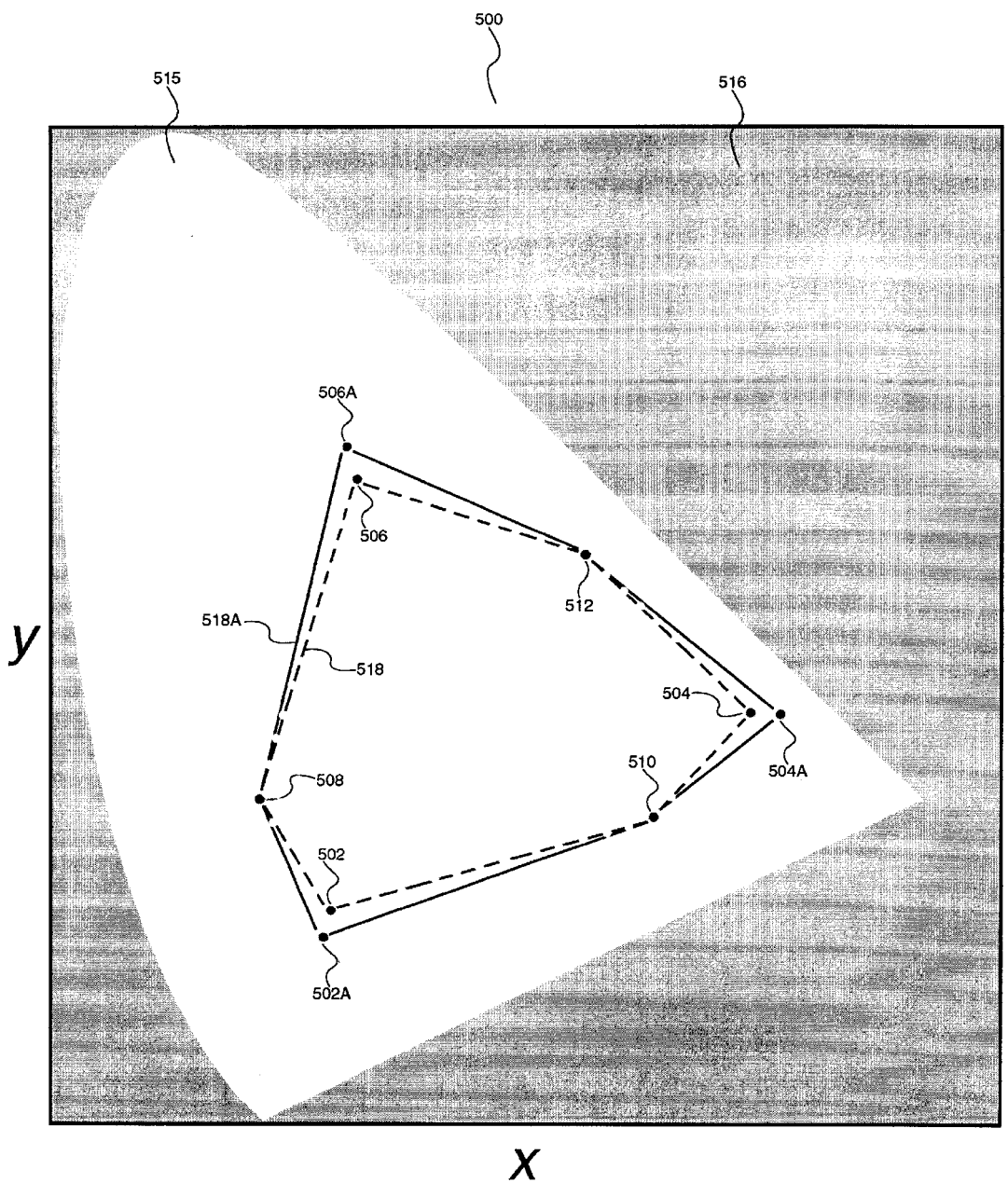
FIG. 5 graphically illustrates an example of a relationship between additivity failure and a color gamut.

FIG. 5 graphically illustrates an example of a relationship between additivity failure and a color gamut using exemplary perimeter points for three color channels and three overprints. The use of CGDAFs may provide a significant contribution to facilitate the matching of an appearance of an image created with a larger gamut by using an image created with an expanded smaller gamut. It may be illustrative to discuss the conceptual relationship between two systems with different additivity failure rates. Differences in overprint mismatches represent an additivity failure rate between two systems even where color gamuts are matched at the Cyan, Magenta, and Yellow values. Referring now to FIG. 5, an exemplary two-dimensional representation 500 of a comparison between two systems with different additivity failure rates is shown. Representation 500 illustrates the concept using by example, and not by limitation, hypothetical values similar to those created by SWOP printing standards for use on photomechanical proofing and printing press RM/CRSs.

A shaded outlying area 516 defines parts of the color space that are beyond the visible color space denoted by a white or non-shaded area 515. Perimeter 518A illustrates density values of a system with a larger gamut of a colorant set-RM/CRS pair with high-efficiency system admixture characteristics as may be determined in response to a characterization of system additivity failure. Thus, the system corresponding to perimeter 518A has a larger gamut than that corresponding to perimeter 518. As one example, in many cases, the relative shapes of perimeters 518 and 518A may be represented by outputs from a press output device and a proofing device, respectively.

More specifically, perimeter 518A includes a blue solid density color perimeter point 502A, a red solid density color perimeter point 504A, and a green solid density color perimeter point 506A. Similarly, perimeter 518 includes a blue solid density color perimeter point 502, a red solid density color perimeter point 504, and a green solid density color perimeter point 506. Blue color perimeter points 502A and 502 are overprints of Cyan and Magenta, red color perimeter points 504A and 504 are overprints of Magenta and Yellow, and green color perimeter points 506A and 506 are overprints of Cyan and Yellow. Perimeter points 508, 510, and 512 illustrate common values for Cyan, Magenta and Yellow color samples for both colorant set-RM/CRS pairs. The half-tone or tonal densities of all combinations of cyan, yellow and magenta for each of the two respective systems fall within the respective perimeters 518 and 518A.

ICC color management systems attempt to map points outside perimeter 518 to a nearest point within perimeter 518 by either photometric or colorimetric corrections. Unfortunately, this type of gamut mapping has typically resulted in compromises that may be unacceptable in the printing industry. Moreover, these systems usually attempt to map colors to be used with a proofing device, which usually has a larger color gamut, to those to be used with a printing device, which usually has a smaller color gamut. It is generally possible to mix colorants for a system with a larger gamut to reproduce any color producible by the system with the smaller gamut. Aspects of the present invention provide CGDAFs that may reduce or eliminate these compromises, by allowing calculation of density values that must be run on a press that result in the same chroma, or color intensity, which simulates the gamut of the proof.

FIG. 6 is a block diagram of a system admixture compensation system 600. System 600 includes a computer 620 that may be coupled to a number of elements, including a communication link 615. For example, computer 620 may be coupled through communication link 615 to a computer network, a telephone line, an antenna, gateway, or any other type of communication link. Computer 620 may also be coupled to an input device 610, a proofing device 640, and/or a press output device 650. Press output device 650 may be any printing device such as an offset lithographic production printing press that is capable of providing printed products using presses such as offset lithography, letter press, flexography, gravure and screen printing. In such an embodiment, data may be transferred to and/or received from proofing device 640 and/or press output device 650 to provide automated data transfer for running a print production job.

For example, although traditional systems utilize computers that are currently standalone from a printing device and CTP platemaking devices that are standalone from the printing device, the invention also contemplates the use of networked systems that incorporate modern data processing and transfer capabilities, and where these adjusted values may automatically be electronically provided to any CTP platemaking device now known or developed in the future. As one example, direct imaging methods may be used to rewrite cylinders while on the press output device. In addition, input device 610 such as a densitometer may also have an interface to the system.

Computer 620 may be a general or a specific purpose computer and may include a processor 622, a memory 624, which may include random access memory (RAM) and read only memory (ROM). Computer 620 may be used to execute one or more system admixture compensation applications 626 that may be stored in memory 624 and/or an input/ output device 612. Results may be displayed using a display 616 and/or stored in input/output device 612, which may be any suitable storage medium. Data processing may be performed, alternatively or in addition, using special purpose digital circuitry contained either in computer 620 or in a separate device. Such dedicated digital circuitry may include, for example, application-specific integrated circuitry (ASIC), state machines, fuzzy logic, as well as other conventional circuitry. Computer 620 may be adapted to execute any of the well-known MS-DOS, PC-DOS, OS2, UNIX, MAC-OS, and Windows operating systems or other operating systems including unconventional operating systems.

Input device 610 may be a color density measurement device such as a spectrophotometer, densitometer, scanner, or any other device operable to provide density values. Alternatively, color density measurements can be performed manually by providing values with, for example, a scanner, spectrophotometer, or densitometer and then by inputting the resulting measurements using a keyboard 614 or other means.

Additional input/output devices can be included for reading and storing files and for communication. No particular type hardware or software platform is required for carrying out the present invention, so long as it is capable of executing the processes herein described. Alternatively, in place of computer 620, the present invention can be programmed for execution on or in conjunction with a network of computers, including a system accessible via the Internet, such as on a computer or server computer which executes the programs and/or stores data files. For example, adjustments may be provided to computer 620 in electronic form using a floppy disk, communication link 615, or a combination of both. A production print job may then be run using press output device 650.

The methods of FIGS. 1 and 3–4 may be performed on the computer. These methods may be performed using a variety of logical or functional configurations, and may be performed in multiple or single steps. These methods may also omit various steps, depending on the embodiment. In addition, each of the methods may include additional error checking and/or processing steps. These methods may utilize any language, including object-oriented, Fortran, C, and other languages, and in a particular embodiment may be written in a high-level language such as Clipper or Java. These methods may be stored in machine-readable form on CD-ROM, magnetic disk, or other media, are accessible via the Internet, or are downloadable for input into a computer such as that illustrated in FIG. 600.

While the invention has been particularly shown and described in several embodiments by the foregoing detailed description, a myriad of changes, variations, alterations, transformations and modifications may be suggested to one skilled in the art and it is intended that the present invention encompass such changes, variations, alterations, transformations and modifications as fall within the spirit and scope of the appended claims.

What is claimed is:

1. A system admixture compensation method, comprising:
   providing reference profile density values for at least one overprint color combination having a plurality of colors produced by a reference device using a reference colorant set, the at least one overprint color combination having reference Initial Percent Dot Values (IPDVs);
   providing current profile density values for at least one color combination produced by a current device using a current colorant set, the at least one color combination having current IPDVs;
   quantifying reference Theoretical Percent Dot Values (TPDVs) as reference efficiency attributes using the reference colorant set;
   quantifying current TPDVs as current efficiency attributes using the current colorant set; and
   calculating factors that compensate for at least one difference between image data produced with the reference colorant set and image data to be printed with the current colorant set in response to the reference efficiency attributes and the current efficiency attributes, the factors to be used to adjust the image data to be printed.

2. The method of claim 1, wherein quantifying reference TPDVs as reference efficiency attributes comprises:
   providing a measured density for each of a plurality of color channels for the overprint color combination; and
   calculating the reference TPDVs, the reference TPDVs being required to achieve a measured density for each of the plurality of color channels if the reference device had perfect efficiency.

3. The method of claim 1, further comprising producing at least one one-dimensional color combination produced using the reference colorant set and at least one one-dimensional color combination produced using the current colorant set having proportionality failure characteristics that are substantially similar.

4. The method of claim 3, wherein substantially similar comprises within a tolerance of +/−20%.

5. The method of claim 2, wherein calculating the factors comprises:
   calculating a difference between the reference and the current TPDVs, the current TPDVs being required to achieve a measured density for each of the plurality of color channels if the current device had perfect efficiency to obtain the factors.

6. The method of claim 5, further comprising:
   normalizing the current TPDVs in response to the reference TPDVs;
   creating adjusted control TPDVs (ACTPDVs) in response to the normalized TPDVs;
   deriving the factors by subtracting the ACTPDVs from the reference TPDVs;
   applying the factors calculated using the reference and current colorant set to the reference IPDVs to transpose the factors into an adjusted file percent dot value (AFPDV); and
   if the AFPDV is not achievable, applying at least one color gamut density adjustment factor to solid major density aimpoints of the current colorant set to compensate for at least one difference between image data produced with the reference colorant set and image data to be printed with the current colorant set.

7. The method of claim 1, wherein the current profile density values comprise:
   a first column representing a plurality of one-dimensional color control regions produced using the current colorant set, the first column located approximately along a first axis generally parallel to an output path of the current device;
   a second column representing a plurality of multi-dimensional color control regions produced using the current colorant set, the second column located approximately along a second axis generally parallel to and at a lateral spacing from the first axis; and
   wherein the first axis and the second axis are positioned proximate to one another and wherein the lateral spacing does not exceed a predetermined distance.

8. The method of claim 6, further comprising calculating the at least one color gamut density adjustment factor if the sum of at least one of the factors and a corresponding at least one of the reference IPDVs exceeds 100 percent.

9. The method of claim 8, further comprising calculating at least one secondary percent dot value color correction factors in response to the at least one color gamut density adjustment factor.

10. The method of claim 1, further comprising repeating the steps of providing current profile density values, quantifying reference TPDVs, quantifying current TPDVs, and calculating factors for each sample of interest in a current profile.

11. The method of claim 1, wherein the reference device comprises a proofing device and the current device comprises a press output device.

12. A system admixture compensation method, comprising:
- identifying system admixture characteristics of data produced by a reference device using a reference colorant set as reference Theoretical Percent Dot Values (TPDVs) in response to reference profile density values and reference Initial Percent Dot Values (IPDVs);
- identifying system admixture characteristics of data produced by a current colorant set as current TPDVs in response to current profile density values and current IPDVs;
- providing color gamut density adjustment factors if the sum of at least one factor and a corresponding at least one of the reference IPDVs exceeds 100 percent, the color gamut density adjustment factors operable to correct the color gamut mismatch and calculated by determining a control component and calculating a product of a first value equal to a targeted solid major density aimpoint of the control component and the at least one factor, and a second value equal to a reference TPDV, for the control component, required to achieve a measured density for each of a plurality of color channels if the reference device had perfect efficiency divided by a current TPDV, for the control component, required to achieve a measured density for each of a second plurality of color channels if the current device had perfect efficiency to obtain the at least one factor; and
- wherein the at least one factor compensates for at least one difference between image data produced with the reference colorant set and image data to be printed with the current colorant set and are used to adjust and generate the image data to be printed.

13. The method of claim 12, wherein the reference device comprises a proofing device and the current device comprises a press output device.

14. The method of claim 12, further comprising identifying system admixture characteristics of data produced by the current colorant set in response to tone reproduction color samples (TRCSs) associated with the current profile density values.

15. The method of claim 12, further comprising adjusting the image data to be printed in response to tonal reproduction characteristics.

16. A system admixture compensation application, comprising:
- a processing module;
- logic residing on the processing module and operable to
  - provide reference profile density values for at least one overprint color combination having a plurality of colors produced by a reference device using a reference colorant set, the overprint color combination having reference Initial Percent Dot Values (IPDVs);
  - provide current profile density values for at least one color combination produced by a current device using a current colorant set, the color combination having current IPDVs;
  - quantify reference Theoretical Percent Dot Values (TPDVs) as reference efficiency attributes using the reference colorant set;
  - quantify current TPDVs as current efficiency attributes using the current colorant set;
  - calculate factors that compensate for at least one difference between image data produced with the reference colorant set and image data to be printed with the current colorant set in response to the reference efficiency attributes and the current efficiency attributes, the factors to be used to adjust the image data to be printed.

17. The system admixture compensation application of claim 16, wherein the logic is further operable to calculate at least one of the factors by:
- determining a control component associated with one of the current profile density values;
- determining a density adjustment in response to the sum of a difference between a density of a first non-control component of a reference Sample of Interest (SOI) and a density of a first non-control component of a current SOI and the difference of a density of a second non-control component of the reference SOI and a density of a second non-control component of the current SOI;
- adjusting the density of the current control component in response to the density adjustment;
- adjusting the TPDV of the control component of the current SOI in response to the adjusted control component density; and
- subtracting the adjusted TPDV of the control component of the current SOI from the TPDV of the control component of the reference SOI to produce the at least one of the factors.

18. The system admixture compensation application of claim 16, wherein the logic is further operable to determine a color gamut density adjustment factor by:
- determining a control component; and
- determining the color gamut density adjustment factor for the component in response to the product of
  - a targeted solid major density aimpoint of the control component and one of the factors, and
  - the reference TPDV for the control component divided by the current TPDV for the control component.

19. The system admixture compensation application of claim 18, wherein the logic is further operable to determine a secondary percent dot value color correction factor in response to the color gamut density adjustment factor.

20. The system admixture compensation application of claim 16, wherein the logic is further operable to determine the factors by interpolation using tone reproduction color samples (TRCSs) associated with the reference profile density values.

21. The system admixture compensation application of claim 16, wherein the current profile density values comprise data produced in a system admixture data form.

22. The system admixture compensation application of claim 16, wherein the reference device comprises a proofing device.

23. The system admixture compensation application of claim 16, wherein the current device comprises a press output device.

24. A system admixture compensation system, comprising:
- a press output device operable to print image data having density values; and
- a computer operable to provide input data associated with the image data to the press output device, the computer further operable to
  - read reference profile density values for at least one overprint color combination having a plurality of colors produced by a reference device using a reference colorant set, the overprint color combination having reference Initial Percent Dot Values (IPDVs);

read current profile density values for at least one color combination produced by the press output device using a current colorant set, the color combination having current IPDVs;

quantify reference Theoretical Percent Dot Values (TPDVs) as reference efficiency attributes using the reference colorant set;

quantify current TPDVs as current efficiency attributes using the current colorant set; and calculate factors that compensate for at least one difference between image data produced with the reference colorant set and image data to be printed with the current colorant set in response to the reference efficiency attributes and the current efficiency attributes, the factors to be used to adjust the image data.

25. The system admixture compensation system of claim 24, wherein the density values are measurable by one of the group consisting of a spectrophotometer, a colorimeter, a densitometer, and a scanner.

26. The system admixture compensation system of claim 24, wherein the press output device input data includes data utilized with at least one of the group consisting of computer-to-plate (CTP) plates, cylinders, interim film/conventional plates, and direct imaging technology.

27. The system admixture compensation system of claim 24, wherein at least a subset of the current profile density values are derived from a data form comprising:

a first column representing a plurality of one-dimensional color control regions produced using the current colorant set, the first column located approximately along a first axis generally parallel to an output path of the press output device;

a second column representing a plurality of multi-dimensional color control regions produced using the current colorant set, the second column located approximately along a second axis generally parallel to and at a lateral spacing from the first column; and wherein the first axis and the second axis are positioned proximate to one another and wherein the lateral spacing does not exceed a predetermined distance.

28. The system admixture compensation system of claim 24, wherein the computer is further operable to calculate the factors by:

calculating a difference between the reference TPDVs, the reference TPDVs being required to achieve the measured density for each of the plurality of color channels if the reference device had perfect efficiency, and the current TPDVs, the current TPDVs being required to achieve the measured density for each of the plurality of color channels if the press output device had perfect efficiency to obtain the factors.

29. A system admixture data form, comprising:

a first column representing a plurality of one-dimensional color control regions produced using a colorant set, the first column representing values that are operable to be printed on a substrate and located approximately along a first axis generally parallel to an output path of a device operable to produce the color control regions;

a second column representing a plurality of multi-dimensional color control regions produced using the colorant set, the second column representing values that are operable to be printed on a substrate and located approximately along a second axis generally parallel to and at a lateral spacing from the first column; and wherein the first axis and the second axis are positioned proximate to one another and wherein the lateral spacing does not exceed a predetermined distance.

30. The system admixture data form of claim 29, wherein the second column is selected from the group consisting of the magenta, red, green, cyan, yellow, blue, and neutral families.

31. The system admixture data form of claim 29, further comprising:

a plurality of first columns located approximately along the first axis generally parallel to the output path of the device;

a plurality of second columns, each of the plurality of second columns located approximately along the second axis generally parallel to and at a lateral spacing from at least one of the plurality of first columns; and wherein each of the plurality of second columns is selected from the group consisting of the magenta, red, green, cyan, yellow, blue, and neutral families.

32. The system admixture data form of claim 29, wherein three of the plurality of second columns is selected from the group consisting of one of the magenta, red, green, cyan, yellow, blue, and neutral families.

33. The system admixture data form of claim 29, wherein density values from selected color control regions of the first column and the second column comprise reference profile density values produced by the device using the colorant set, the reference profile density values each corresponding to reference initial percent dot values (IPDVs), the reference density values further operable to be compared to current profile density values produced by another device using a current colorant set and each associated with current IPDVs, and reference Theoretical Percent Dot Values (TPDVs) are operable to be quantified as efficiency attributes using the colorant set, current TPDVs are operable to be quantified as efficiency attributes produced by the another device using the current colorant set, and factors are operable to be calculated, the factors compensating for at least one difference between image data produced with the reference colorant set and image data to be printed with the current colorant set in response to the reference efficiency attributes and the current efficiency attributes, the factors further to be used to adjust and generate the image data to be printed.

34. The system admixture data form of claim 29, wherein the plurality of one-dimensional color control regions are values stored on a computer-readable storage medium and operable to be printed on a substrate.

35. The system admixture data form of claim 29, wherein the plurality of one-dimensional color control regions are printed on a substrate.

36. The system admixture data form of claim 29, wherein the predetermined distance does not exceed 25 millimeters.

37. The system admixture data form of claim 29, wherein the device comprises a proofing device or a press output device.

38. The system admixture data form of claim 29, wherein the second column further comprises a second plurality of one-dimensional color control regions produced using the colorant set, the second plurality of one-dimensional color control regions operable to be used to determine whether system noise is present in the process of calculating percent dot value color correction factors.

* * * * *

UNITED STATES PATENT AND TRADEMARK OFFICE
CERTIFICATE OF CORRECTION

PATENT NO. : 6,725,772 B2
DATED : April 27, 2004
INVENTOR(S) : Henry Martinez et al.

It is certified that error appears in the above-identified patent and that said Letters Patent is hereby corrected as shown below:

Column 15,
Line 35, the word "contorl" should be replaced with -- control --;
Line 40, the word "Comer" should be replaced with -- Corner --;

Column 16,
Line 37, the numbers "1907-4924" should be replaced with -- 1907-1924 --;

Column 23,
Line 4, after the words "Aimpoint for Cyan ("Tcyan")", add -- + --

Signed and Sealed this

Sixth Day of July, 2004

JON W. DUDAS
*Acting Director of the United States Patent and Trademark Office*